United States Patent
Flynn, IV et al.

(10) Patent No.: US 11,870,873 B2
(45) Date of Patent: Jan. 9, 2024

(54) SERVICE LAYER-BASED METHODS TO ENABLE EFFICIENT ANALYTICS OF IOT DATA

(71) Applicant: CONVIDA WIRELESS, LLC, Wilmington, DE (US)

(72) Inventors: William Robert Flynn, IV, Schwenksville, PA (US); Dale N. Seed, Allentown, PA (US); Catalina Mihaela Mladin, Hatboro, PA (US); Quang Ly, North Wales, PA (US); Zhuo Chen, Claymont, DE (US); Lu Liu, Conshohocken, PA (US); Jiwan L. Ninglekhu, Conshohocken, PA (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/973,496

(22) PCT Filed: Jun. 21, 2019

(86) PCT No.: PCT/US2019/038484
§ 371 (c)(1),
(2) Date: Dec. 9, 2020

(87) PCT Pub. No.: WO2019/246530
PCT Pub. Date: Dec. 26, 2019

(65) Prior Publication Data
US 2021/0243271 A1    Aug. 5, 2021

Related U.S. Application Data

(60) Provisional application No. 62/688,873, filed on Jun. 22, 2018.

(51) Int. Cl.
 *H04L 67/60* (2022.01)
 *G16Y 40/20* (2020.01)
 (Continued)

(52) U.S. Cl.
 CPC .............. *H04L 67/60* (2022.05); *G16Y 10/75* (2020.01); *G16Y 40/20* (2020.01); *H04L 67/12* (2013.01)

(58) Field of Classification Search
 None
 See application file for complete search history.

(56) References Cited

U.S. PATENT DOCUMENTS

| 8,478,788 B1 * | 7/2013 | Frazier | G06Q 10/06 707/802 |
| 2013/0179450 A1 * | 7/2013 | Chitiveli | G06F 16/27 707/737 |

(Continued)

FOREIGN PATENT DOCUMENTS

CN    109104461 A    * 12/2018

OTHER PUBLICATIONS

Unknown: "Authorization", Wikipedia, Retrieved from https://en.wikipedia.org/w/index.php?title=Authorization&oldid=843449768, Retrieved on Mar. 22, 2023, p. 1.

*Primary Examiner* — Chris Parry
*Assistant Examiner* — Abderrahmen Chouat
(74) *Attorney, Agent, or Firm* — BakerHostetler

(57) ABSTRACT

Methods, systems, and apparatuses that enable a Service Layer (SL) to support analysis of internet of things (IoT) data and enable shared access to information generated by the analysis. An analytics management service may allow SL entities to configure analytics functions for many different IoT sources of data and organize the results in a customizable manner. The SL may support coordinating the
(Continued)

analysis of IoT data from multiple independent sources and organizing the results of the analysis.

20 Claims, 26 Drawing Sheets

(51) Int. Cl.
*G16Y 10/75* (2020.01)
*H04L 67/02* (2022.01)
*H04L 67/12* (2022.01)

(56) References Cited

U.S. PATENT DOCUMENTS

| | | | |
|---|---|---|---|
| 2014/0137006 A1* | 5/2014 | Goodwin | G06F 16/958 715/760 |
| 2014/0280338 A1* | 9/2014 | Metz | H04L 41/0853 707/774 |
| 2015/0080044 A1* | 3/2015 | McHenry | H04W 4/38 455/515 |
| 2015/0271033 A1* | 9/2015 | Srivastava | H04L 12/2825 709/224 |
| 2017/0235585 A1* | 8/2017 | Gupta | H04L 41/12 718/1 |
| 2018/0006913 A1* | 1/2018 | Asenjo | H04L 41/0631 |
| 2019/0075080 A1* | 3/2019 | Entezari | H04L 63/061 |

* cited by examiner

| Application(s) |
| Service Layer (SL) |
| Application Protocols (e.g. HTTP, COAP, MQTT) |
| Transport Protocols (e.g. TCP, UDP) |
| Network Protocols (e.g. IPv4/IPv6) |
| Access Network Protocols (e.g. Ethernet, Cellular, Wi-Fi) |

FIG. 26

SERVICE LAYER-BASED METHODS TO ENABLE EFFICIENT ANALYTICS OF IOT DATA

CROSS-REFERENCE TO RELATED APPLICATIONS

This application is the National Stage of International Patent Application No. PCT/US2019/038484, filed. Jun. 21, 2019, which claims the benefit of U.S. Provisional Patent Application No. 62/688,873, filed Jun. 22, 2018, the disclosures of which are incorporated herein by reference in their entireties.

BACKGROUND

An IoT Service Layer (SL) is a technology specifically targeted towards providing value-added services for IoT devices, IoT applications and IoT data. Recently, several industry standard bodies (e.g., oneM2M, ETSI, OCF and LWM2M) have been developing IoT SLs to address the challenges associated with the integration of IoT devices, applications and data into deployments with the Internet/Web, cellular, enterprise, and home network.

An IoT SL can provide applications and devices access to a collection of IoT oriented capabilities. A few examples include security, charging, data management, device management, discovery, provisioning, and connectivity management. These capabilities are made available to applications via APIs which make use of message formats, resource structures, and resource representations supported by the IoT SL.

From a protocol stack perspective, SLs are typically situated above the Application Protocol Layer and provide value added services to applications they support. Hence SLs are often categorized as 'middleware' services. FIG. 1 shows an exemplary service layer between the Application Protocols and Applications.

From a deployment perspective, an IoT SL can be deployed on various types of network nodes including servers, gateways and devices as shown in FIG. 2.

The oneM2M TS-0001 oneM2M Functional Architecture defines an IoT SL. The SL provides "horizontal" services that may be utilized by different "vertical" IoT systems and applications, such as e-Health, fleet management, and smart homes. The architecture of the oneM2M SL, as shown in FIG. 3, defines a Common Service Entity (CSE) that supports four reference points. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. A CSE contains multiple logical functions called "Common Service Functions (CSFs)", such as "Discovery", "Data Management & Repository". FIG. 4 illustrates the CSFs supported by oneM2M.

The oneM2M architecture is a distributed architecture and supports deploying IoT services in a distributed manner across the following types of Nodes. An Application Service Node (ASN) is a Node that contains one CSE and contains at least one Application Entity (AE). Example of physical mapping: an ASN could reside in an IoT Device. An Application Dedicated Node (ADN) is a Node that contains at least one AE and does not contain a CSE. Example of physical mapping: An Application Dedicated Node could reside in a constrained IoT Device. A Middle Node (MN) is a Node that contains one CSE and contains zero or more AEs. Example of physical mapping: a MN could reside in an IoT Gateway. An Infrastructure Node (IN) is a Node that contains one CSE and contains zero or more AEs. A CSE in an IN may contain CSE functions not applicable to other node types. Example of physical mapping: an IN could reside in an IoT Service Infrastructure. A Non-oneM2M Node (NoDN) is a Node that does not contain oneM2M Entities (neither AEs nor CSEs). Such Nodes represent devices attached to the oneM2M system for interworking purposes, including management. The possible configurations of inter-connecting the various entities supported within the oneM2M system are illustrated in FIG. 5.

FIG. 6 shows the non-roaming reference architecture with service-based interfaces within the Control Plane. FIG. 7 depicts the 5G System architecture in the non-roaming case, using the reference point representation showing how various network functions interact with each other. The mobility management and session management functions are separated. A single N1 NAS connection is used for both Registration Management and Connection Management (RM/CM) and for SM-related messages and procedures for a UE. The single N1 termination point is located in AMF. The AMF forwards SM related NAS information to the SMF. AMF handles the Registration Management and Connection Management part of NAS signaling exchanged with the UE. SMF handles the Session management part of NAS signaling exchanged with the UE.

In 5G network, 3GPP TS 23.501, System Architecture for the 5G System; Stage 2, Network Data Analytics (NWDA) is defined as a network function to represent operator managed network analytics logical function. NWDA provides network slice specific network data analytics to the PCF. The subscription to NWDA by PCF is on a network slice level and the NWDA is not required to be aware of the current subscribers using the slice. NWDA notifies/publishes slice specific network status analytic information to the PCF(s) that are subscribed to it. This information is not subscriber specific. PCF uses that data in its policy decisions.

NWDA reference point resides between the Network Data Analytics (NWDA) and the PCF. According to 3GPP TS 23.502, Procedures for the 5G System; Stage 2, the PCF could get analytics data from NWDA by either request/response model or subscription/notification model. FIG. 8-FIG. 10 show these message flows.

In 5G network, two types of DSF are defined: Unstructured Data Storage network function (UDSF) and Structured Data Storage Function (SDSF). As shown in FIG. 11, the 5G system architecture allows a network function to store and retrieve its unstructured data into/from a UDSF. The UDSF belongs to the same PLMN where the network function is located. Control plane NFs may share a UDSF for storing their respective unstructured data or may each have their own UDSF (e.g. a UDSF may be located close to the respective network function). The UDSF is an optional function that supports Storage and retrieval of information as unstructured data by any network function.

As shown in FIG. 12, the 5G system architecture allows the NEF to store structured data in the SDSF intended for external and internal network exposure by the NEF. SDSF belongs to the same PLMN where the Network Exposure Function (NEF) is located. The SDSF is an optional function that supports storage and retrieval of information as structured data by the NEF.

SUMMARY

Disclosed herein are methods, systems, and apparatuses that may enable a Service Layer (SL) to support analysis of IoT data and may enable shared access to information generated by the analysis. The Analytics Management Service described herein may allow SL entities to configure Analytics Functions for many different IoT sources of data and organize the results in a customizable manner that may allow easier access and more granular authorization. A SL may support an Analytics Management Service (AMS) capable of coordinating the analysis of IoT data from multiple independent sources and organizing the results of the analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 26 illustrates an exemplary graphical user interface;

DETAILED DESCRIPTION

Figures 1, 2:
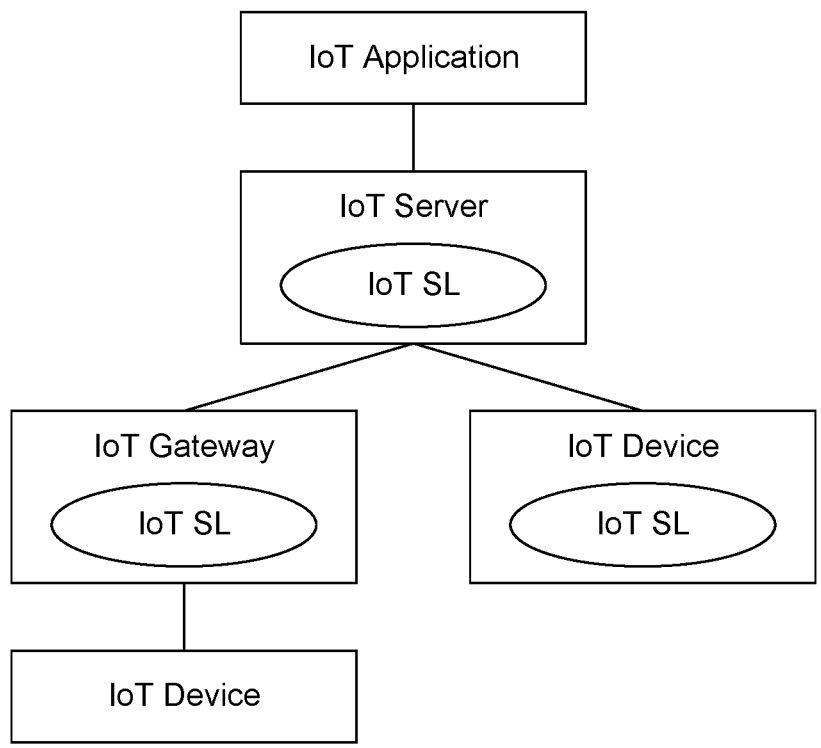
FIG. 1 illustrates an exemplary Protocol Stack Supporting a Service Layer.
FIG. 2 illustrates an exemplary IoT SL deployed on various types of network nodes.
Figure 3:
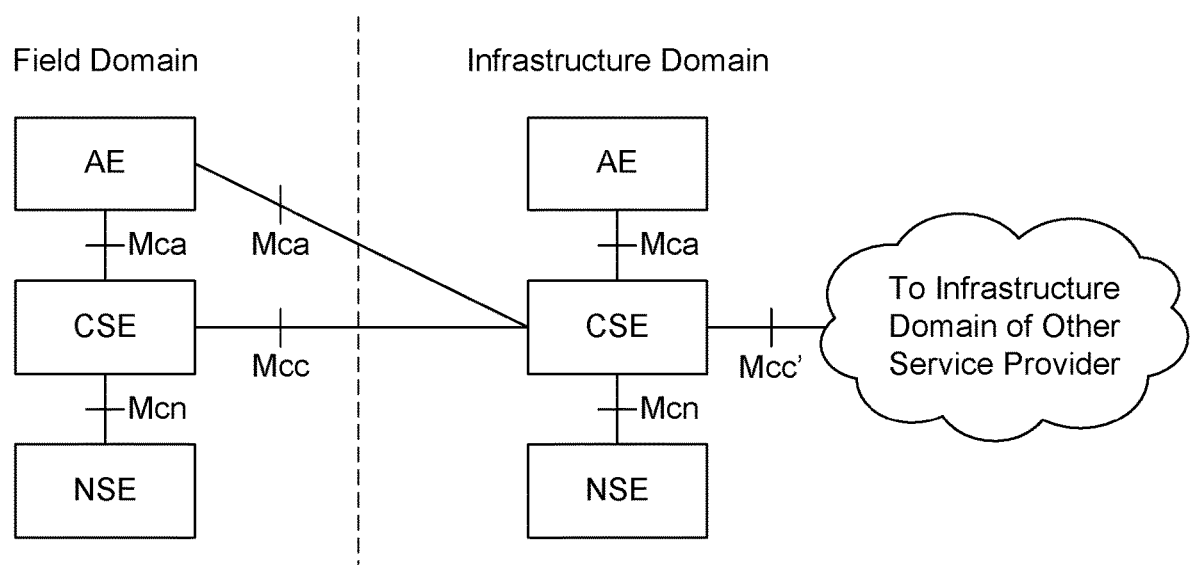
FIG. 3 illustrates an exemplary oneM2M Architecture.
Figure 4:
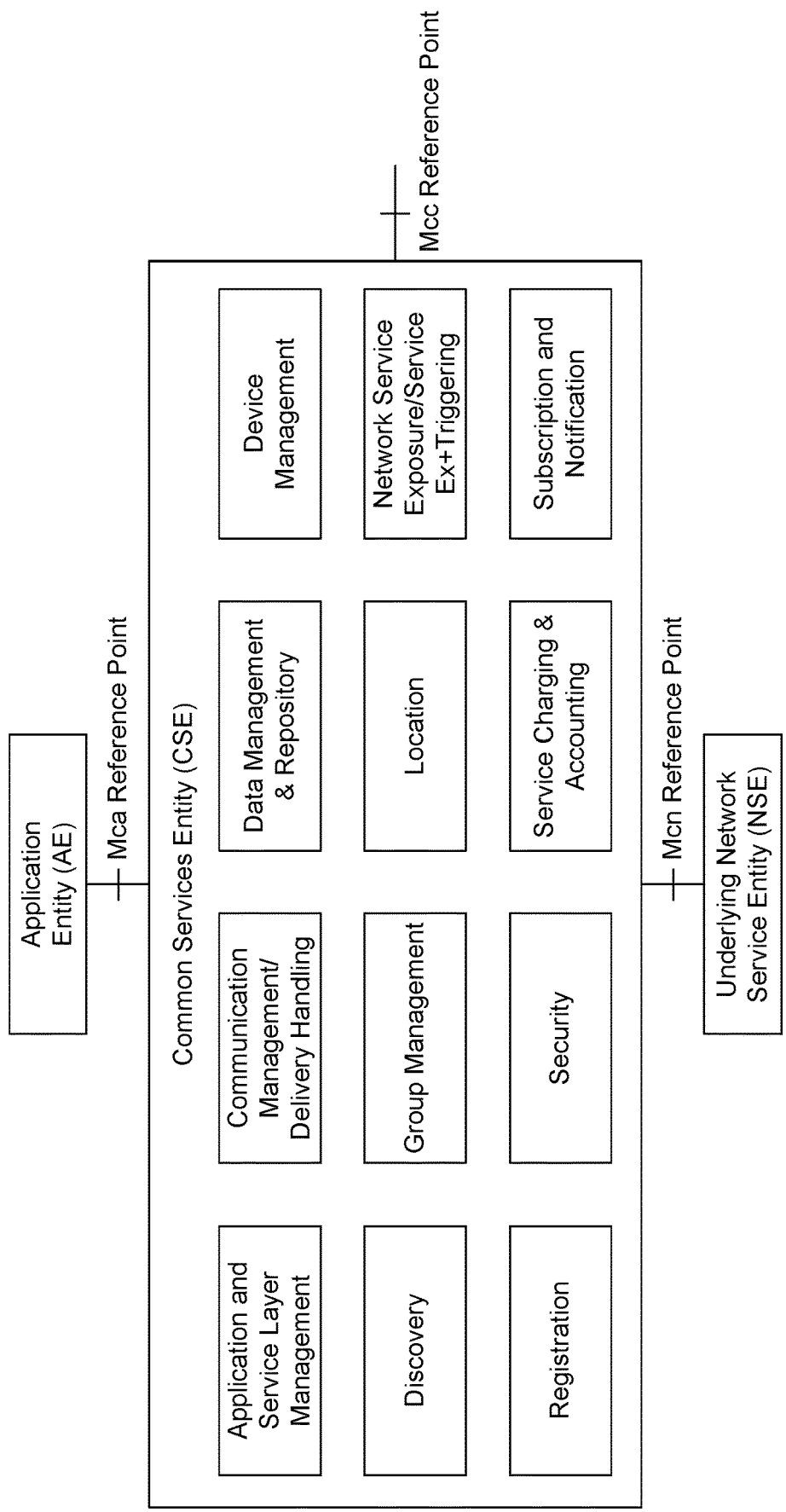
FIG. 4 illustrates exemplary oneM2M Common Service Functions.
Figure 5:
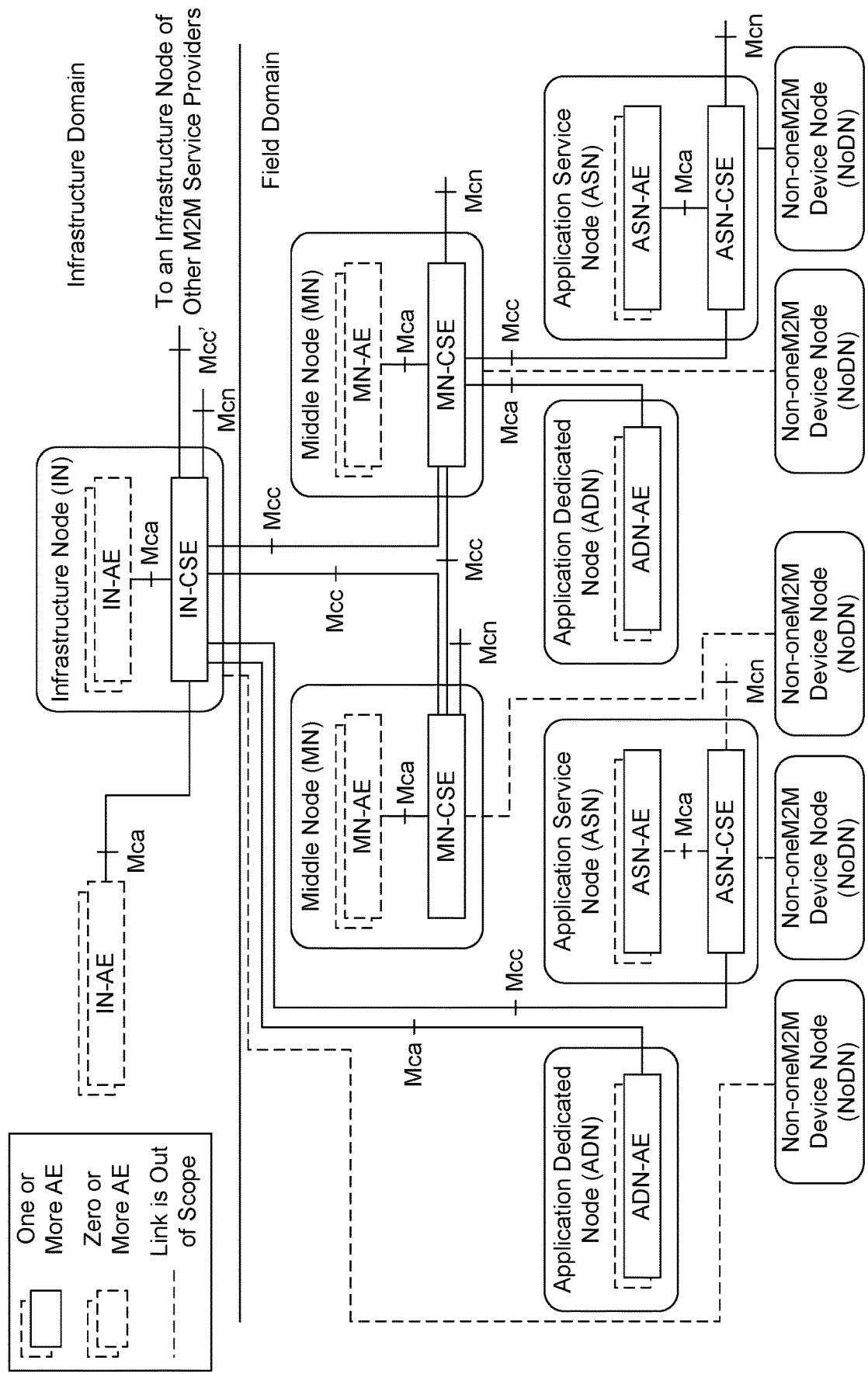
FIG. 5 illustrates exemplary Configurations supported by oneM2M Architecture.
Figure 6:
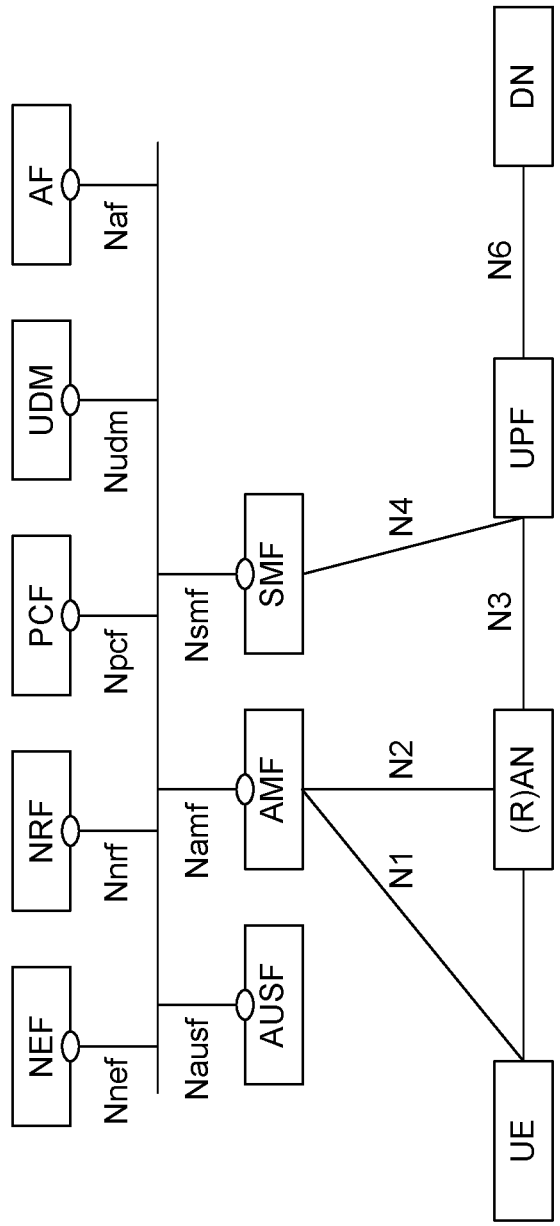
FIG. 6 illustrates an exemplary 5G System Service-based architecture.
Figure 7:
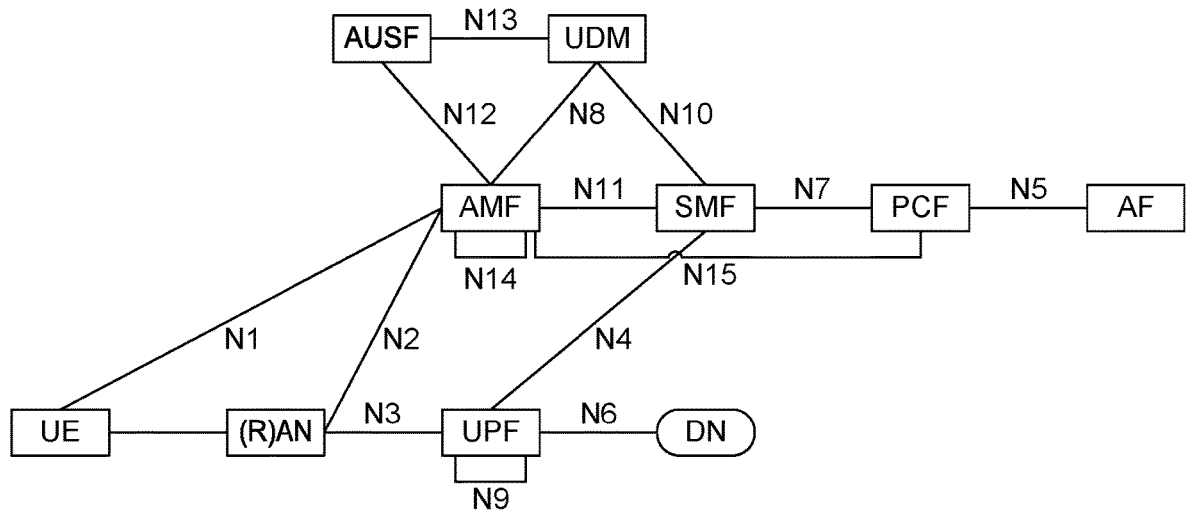
FIG. 7 illustrates an exemplary Non-Roaming 5G System Architecture in reference point representation.
Figure 8:
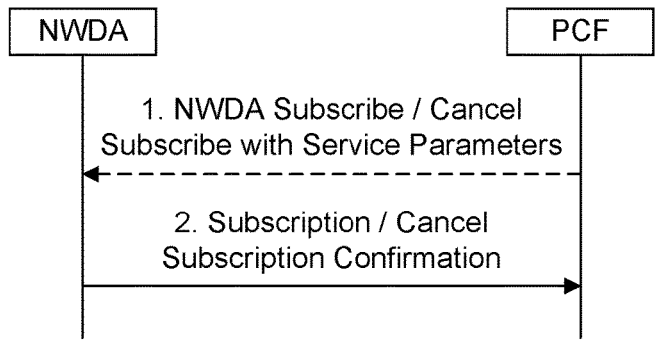
FIG. 8 illustrates an exemplary NWDA Subscription Service.
Figure 9:
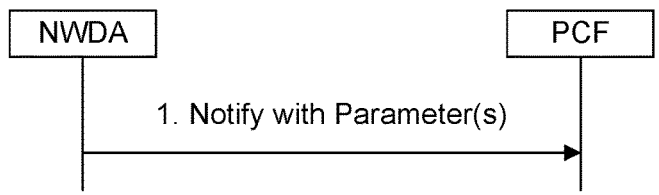
FIG. 9 illustrates an exemplary NWDA Notification Service.
Figure 10:
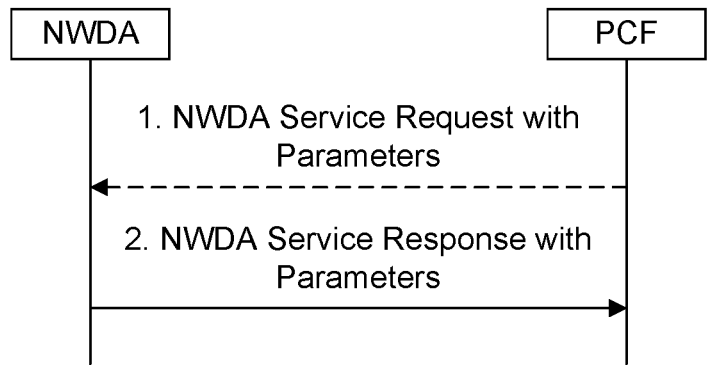
FIG. 10 illustrates an exemplary NWDA Request/Response Flow.
Figure 11:
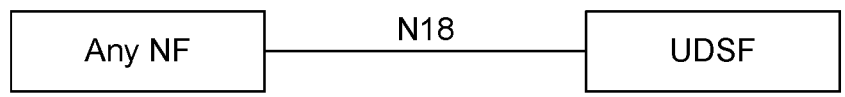
FIG. 11 illustrates an exemplary Data storage architecture for unstructured data from any NF.
Figure 12:
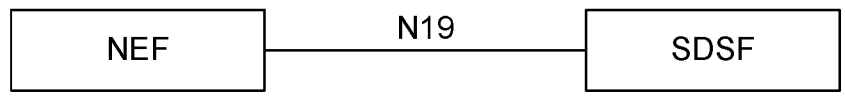
FIG. 12 illustrates an exemplary Data storage architecture for structured data from the NEF.

In large scale IoT deployments there will be massive amounts of data collected and stored. Big data analytics methods are used to generate meaning from the raw data. Some types of big data analytics includes analysis of historical data, image classification or recognition. Generating value from the massive amounts of data collected will require the ability to analyze the data efficiently.

IoT Service Layer capabilities are focused on collection and storage of the data and access to the data. Providing analysis of data requires a lot of external processing. For example, image recognition of photos from a security camera in a oneM2M SL would require the creation of a <subscription> resource to each container where the images are stored. Then when each image is stored in the oneM2M SL a notification would be sent to a dedicated oneM2M application that would analyze the image. Then the results would be written back to a location that needs to be configured as well.

The above describes a type of configuration that is needed for the image stored in the SL, to use the image recognition functionality. If multiple cameras are used, then this configuration has to be repeated for each source of image data. If a different "owner" of the cameras needs to perform the same type of analysis, then additional repetitive configuration is added to the system. Without native support for data analytics in an IoT Service Layer there is a fair amount of repetitive configuration that systems designers or users need to handle. For example, consider the scenario where data analytics functions are interested in specific types of data. In such a scenario, the service layer needs to be configured to know what type of data each analytics functions is interested in so that the service layer may forward the data to each interested data analytics function. A similar problem exists in the 3GPP 5G core (5GC) network. 5GC Network Functions have access to an abundant amount of data about network activity or UE activity. Procedures are needed to define how 5GC NFs may be configured to provide select information to the NWDAF.

Disclosed herein are methods, systems, and apparatuses that may enable a Service Layer (SL) to support analysis of IoT data and may enable shared access to information generated by the analysis. The Analytics Management Service described herein may allow SL entities to configure Analytics Functions for many different IoT sources of data and organize the results in a customizable manner that may allow easier access and more granular authorization. A SL may support an Analytics Management Service (AMS) capable of coordinating the analysis of IoT data from multiple independent sources and organizing the results of the analysis. The AMS may be configured with multiple Analytic Functions that may analyze IoT SL data from multiple sources. The AMS may be configured with policies that customize the analysis performed on IoT Data by specifying the configuration of the Analytic Function (AF) for each source or groups of sources of IoT data. The AMS may be configured with policies that define how the results are stored in the IoT SL so that the results are readily accessible. The AMS may be configured to examine new data as it arrives in the IoT SL and determine if the new data should be sent to a AF. The AMS may provide methods of accessing the results of the data analysis that efficiently access relevant data. The AMS may be configured to provide authorization to data with certain detected characteristics without giving authorization to the raw data source. AMS may be configured to provide pre-processing of selected data before storage in the IoT SL.

Figure 13:
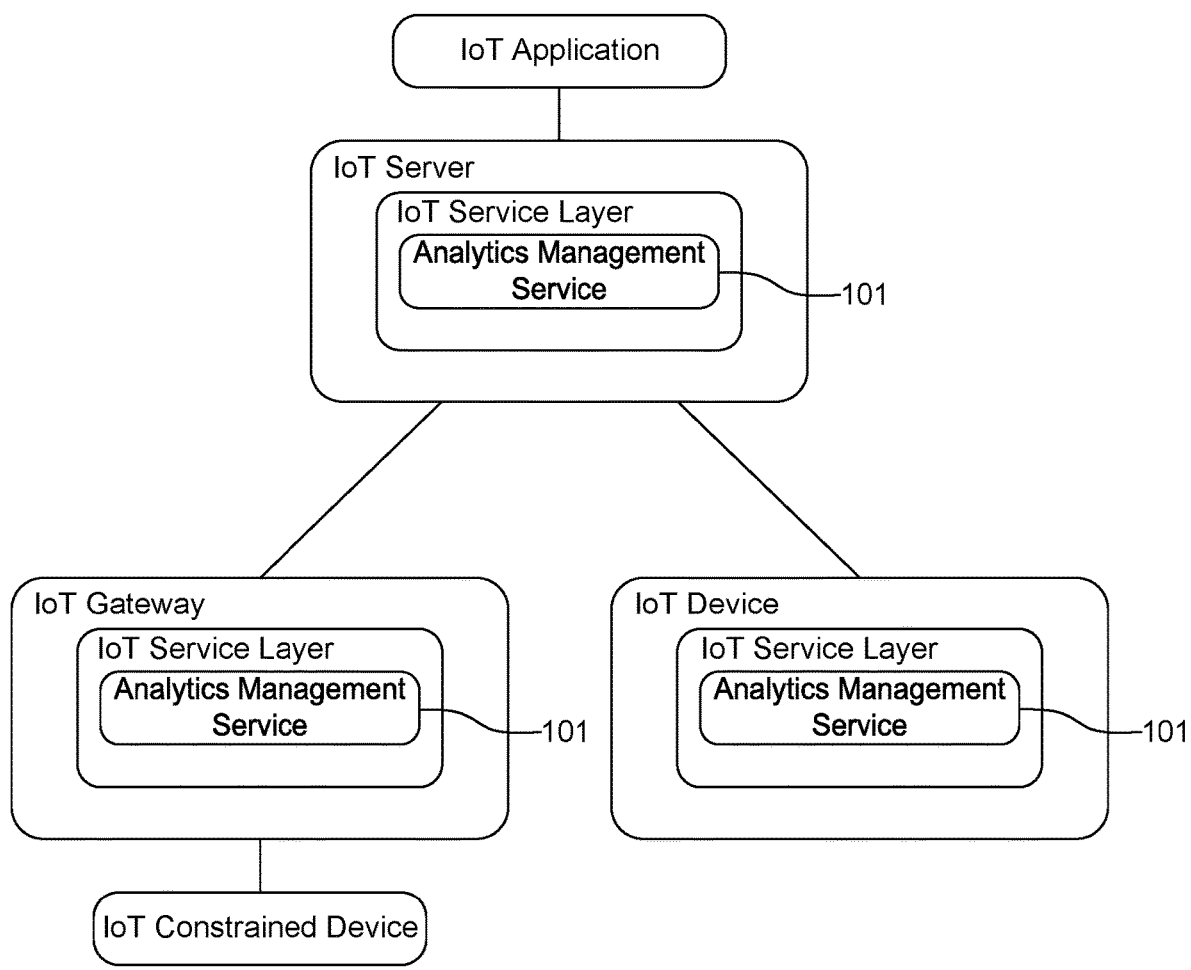
FIG. 13 illustrates an exemplary Analytics Management Service Deployment Options.
Figure 14:
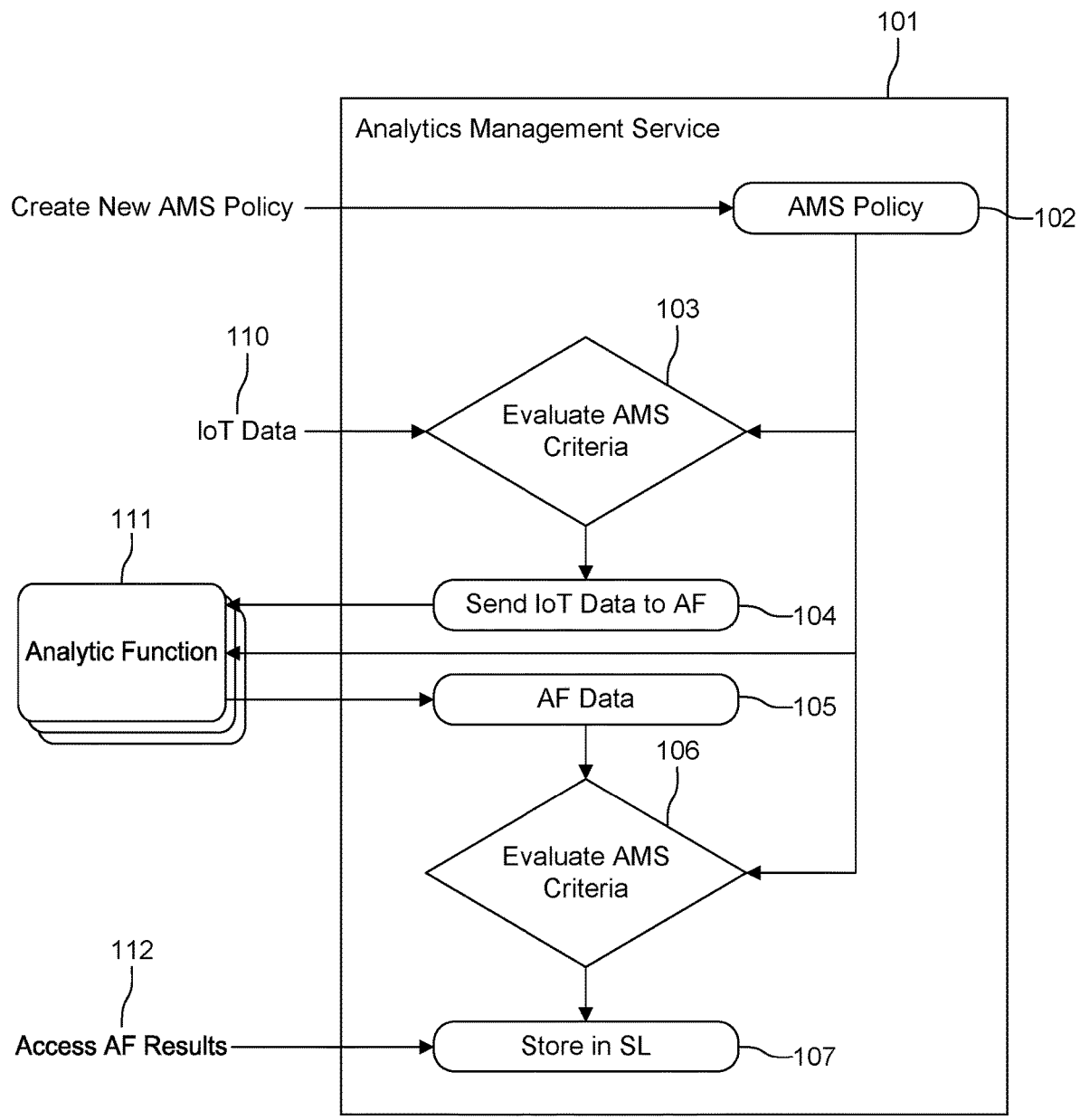
FIG. 14 illustrates an exemplary Analytics Management Service Flow Chart.

FIG. 13 illustrates exemplary AMS Deployment Options. AMS 101 may be supported as a service within an IoT SL that is hosted on a server, gateway or device as shown in FIG. 13. FIG. 14 illustrates an exemplary architecture of the AMS. AMS 101 may be configured with policies (AMS Policy 102) that define how to configure an Analytics Function, select which IoT data to send to the analytics process, and how to make the results of the analytics process available to IoT entities. AMS Policies are described in more detail herein. AMS 101 may monitor IoT data 110 as it arrives in the SL from sensors. At step 110 is showing arrival of a IoT data at the SL, which is a trigger to begin an action (103) of comparing information about the data with AMS policies to determine what to do next (103). Access AF result 112 is an entity that tries to access the stored data. Once the data is stored, the access has a couple new APIs that may be used (e.g., Request 171-Request 175 disclosed below). AMS 101 may compare information about IoT data 110 with AMS policies 102 to determine (at block 103) if the IoT data should be sent to an Analytic Function (AF) 111. An AF 111 may be considered a service that performs analysis on data sent by an IoT SL and provides a result back to the SL. AF may be NWDA as described herein. Network Data Analytics (NWDA) is defined as a network function to represent operator managed network analytics logical function. AMS 101 may receive results from one or more AFs 111. AMS policies 102 may define how to store the results (e.g., AF data 105) from AF 111 and how to make it available to SL entities. Receiving and storage of AF data 105 is described in more detail herein.

Figure 15:
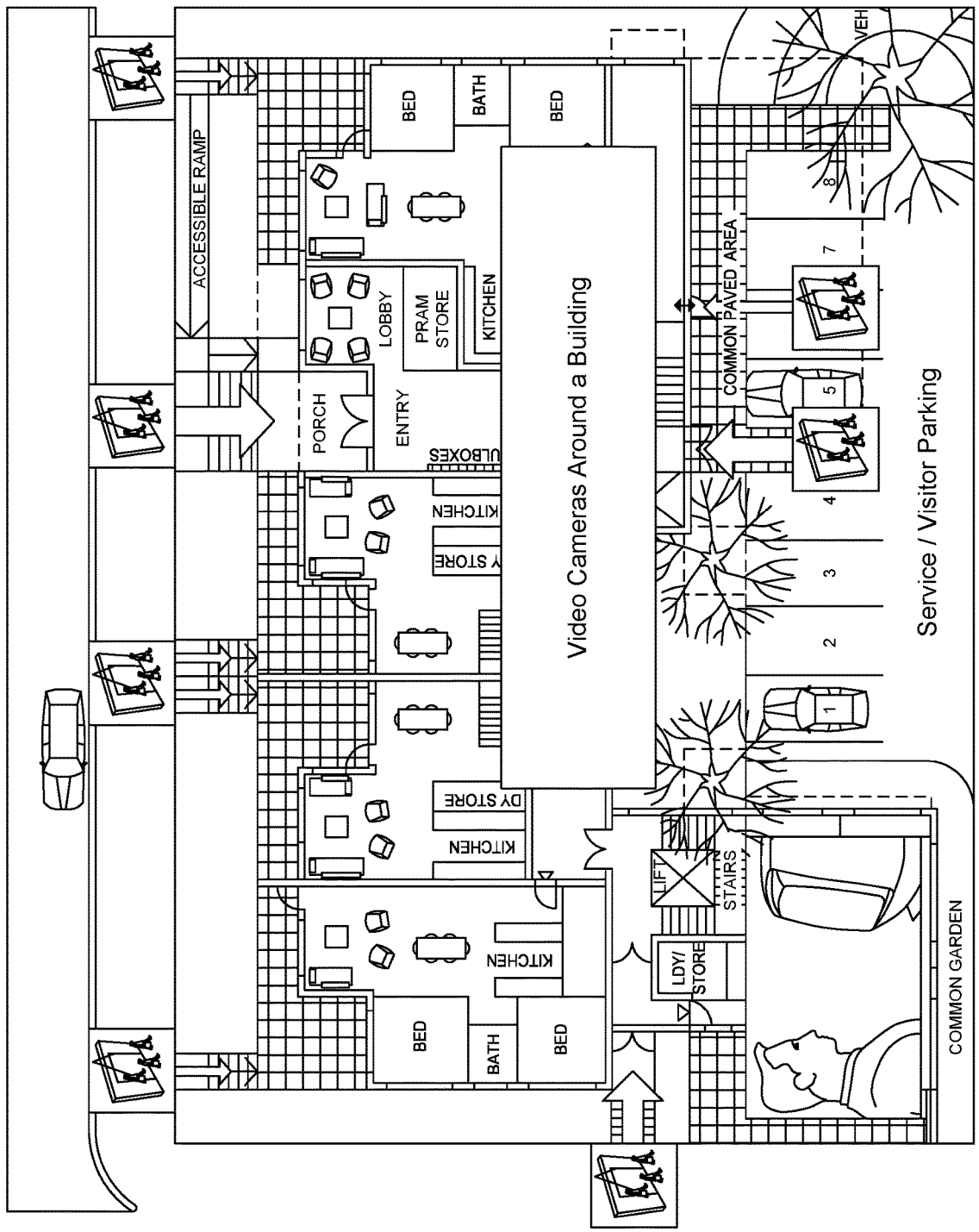
FIG. 15 illustrates an exemplary AMS use case.

FIG. 15 provides an exemplary AMS 101 use case. In this use case, video cameras are positioned in or around a building. The video cameras, and perhaps other sensors, are used for security in the building. The sensors (including the cameras) send data to a SL where the data is stored. The desired result is to identify all people entering and exiting the building. The people entering should be identified by name or ID. A user of the SL data wants to be able to quickly see the people that entered the building, see the people that are remaining in the building, and to find the identity of those remaining in the building. AMS policy 102 is configured to analyze data captured from all of the web camera images. The AF(s) analyzes the image to determine that if a person is in the image, whether the person is entering or leaving, and who is left in the building (The implementation of this AF is not described in depth, but is within the capabilities of current image recognition services). AMS policy 102 also defines how to store the AF results such that the images are grouped in a manner that allows access to each of these desired categories (e.g., images with "identified" people are in a single location).

AMS 101 may be configured with policies that define how to configure analytics function 111, select which IoT data to send to the analytics process, or how to make the results of the analytics process available to IoT entities. These rules may be defined via AMS Policy attributes such as the ones proposed in Table 1. In one example, the AMS Policy may be stored within SL resources. The SL resources may be created, retrieved, updated, or deleted by the AMS 101 or SL entities or both.

TABLE 1

Analytics Management Service (AMS) Policy

| Attribute | Description |
|---|---|
| Policy ID | Identifier of the AMS policy. Using this value an IoT entity (or possibly an AF) may access the policy. Access may be conditional on authorization polices of the IoT SL. Access may be for the purpose of creating a new policy, retrieving a policy, updating a policy, or removing a policy. |
| IoT Data Selection Criteria | Information used to select which data is sent to an AF. For example this could be a specific list of sensors, such as camera1 and camera2, or it could be a sensor type, such as image or temperature. This is further described herein. |
| Analytics Function Configuration | Defines which AF, if there are multiple, to send SL data for analysis. This is further described herein.<br>Defines the manner in which data is sent from the SL to the AF.<br>Identifies the communication protocol(s) used, or the format of the data used.<br>Identifies sources of configuration information, e.g. Image library of employees used for identification. |
| Results Storage | Defines the way results from the AF are stored. This is further described herein.<br>Result Location<br>Results may be stored as a child of the AMS policy or an alternate location could be specified as the root of the AF Results storage.<br>Results may be stored based on characteristics detected by the AF, e.g., "entering", "exiting", "ID" where these are examples of information that can be generated by the AF, such as detecting that an image contains a person with ID that is entering a building or exiting the building.<br>Original data location<br>Result Content<br>Results may be stored as a copy of the original data provided by the SL.<br>Results may be stored as a link to the location where the SL stores the original data.<br>Results may be annotated with meta-information containing characteristics detected by the AF.<br>Result Accessibility |

TABLE 1-continued

Analytics Management Service (AMS) Policy

| Attribute | Description |
|---|---|
| | Results may match data from multiple sensor devices. When the AF results are stored the results are made accessible using linked list type operators, e.g., getFirst, getNext, getPrevious, getLast. Results may be sorted so that they appear in a defined order, e.g. chronological by source of data date, alphabetical by "ID", etc Access to the results may be authorized based on content present in the data. |

The following attributes (Device (e.g., data creator), User (e.g., the profile that uses analyzed data), Data Type, Meta Data, or Data Mode) describe how the SL may select data to be sent to AF 111. The attributes may be used as oneM2M attributes.

Device (e.g., data creator like a specific sensor)—AMS 101 may send data to AF 111 based on a specific list of devices or sources of data. For example, a list of door sensors may be specified to send sensor status from door1, door2 and door5 to AF 111.

User—AMS 101 may send data to AF 111 based on a general list of devices or sources of data. For example, all measurements from my sensors in my apartment may be sent to AF 111, perhaps to identify whether someone is at home. This may represent a group of sources based on a common attribute of the sources, such as they all belong to profile 1 (which may be a subscriber).

Data Type—AMS 101 may send data to AF 111 based on the type of data present. For example, all temperature sensor data may be sent to AF 111.

Meta Data—AMS 101 may send data to AF 111 based on meta-data present. For example, sensors from the parking lot may be sent to AF 111.

Data Mode—Continuous/single shot mode/both/range of samples/periodic schedule

The following attributes (Data representation, data destination, data analysis configuration, or data analysis feedback) describe how to communicate with AF 111. Some of these parameters may not be visible or accessible to SL entities, but are private between AMS 101 and AF 111, which is discussed in more detail herein.

Data Representation—information about the data, an indication that new data is available in the SL (so that the AF can get the data independently), or partial representation of the data that includes contentOnly without associated meta-information, or some custom representation defined by the interface of the AF.

Data Destination—The API used to communicate between the AF and the SL

Data Analysis Configuration—specify characteristics to look for (library of images, threshold value, etc.)

Data Analysis Feedback—When Data Analysis may be improved with confirmation of detected characteristics, this is where to send such feedback. For example an AF that recognizes the ID of a person in an image may request confirmation that the ID is correct and adjust parameters of the AF based on the confirmation.

Each AMS policy, such as result location, result content, or result accessibility may help define the configuration of the way the results are stored. With reference to result location, it may specify where results from AF 111 are stored. For example, result location may define a root location for the storage of results coming from AF 111. A default value may be as a child of the AMS policy. This may be specified as the original location of the IoT source data. In another example, a result structure may be specified as fixed or dynamic. If the result structure is fixed the policy may specify a specific structure for the data storage. If the result structure is dynamic the data structure may be generated based on the characteristics detected by the AF.

With reference to result content, it may specify duplication, annotation, or linking. If the Result Content is Annotation the original IoT data analyzed may be updated to reflect the characteristics detected by AF 111. If the Result Content is Duplicate then a copy of the IoT data analyzed may be stored in the Result Location specified by the root location and result structure (Result Location). The copy of the data may be annotated with the characteristics detected by AF 111. If the Result Content is Link then a reference to the original IoT data may be stored in the Result Location specified by the root location and result structure (Result Location). The stored reference may be annotated with the characteristics detected by AF 111.

With reference to Result Accessibility results from AF 111 may be organized based on the data content. Results may be generated by analysis of data from multiple IoT Sensors or services. In the context of result accessibility, considerations may include authorization, access methods, and sort. Authorization—SL entities that do not have access to the raw sensor data in the original location may be granted authorization to selected portions of the original data based on the presence of characteristics detected by AF 111. For example, referring to the use case described above, if an image analyzed by AF 111 indicates that employee #1234 has entered the building, the result stored may include an authorization for that employee #1234 to access this specific image without giving access to any of the other images. Access Methods—SL entities may access AF 111 results using linked list type operations such as getFirst, getNext, getPrevious, getLast. These access methods may take into consideration the authorization of the SL entity. For example, if employee #1234 wants to see the times that she entered the building over a period, she may request the first result from the "entry" analysis. This may return the first time that employee #1234 entered the building. Then employee #1234 may request the next result which may skip all images that do not allow her authorization and return the next result that she does have authorization to access. Sort—Results may be sorted chronologically by source of data date, alphabetical by annotated characteristics, or other meta-data native to the SL.

Figure 16:
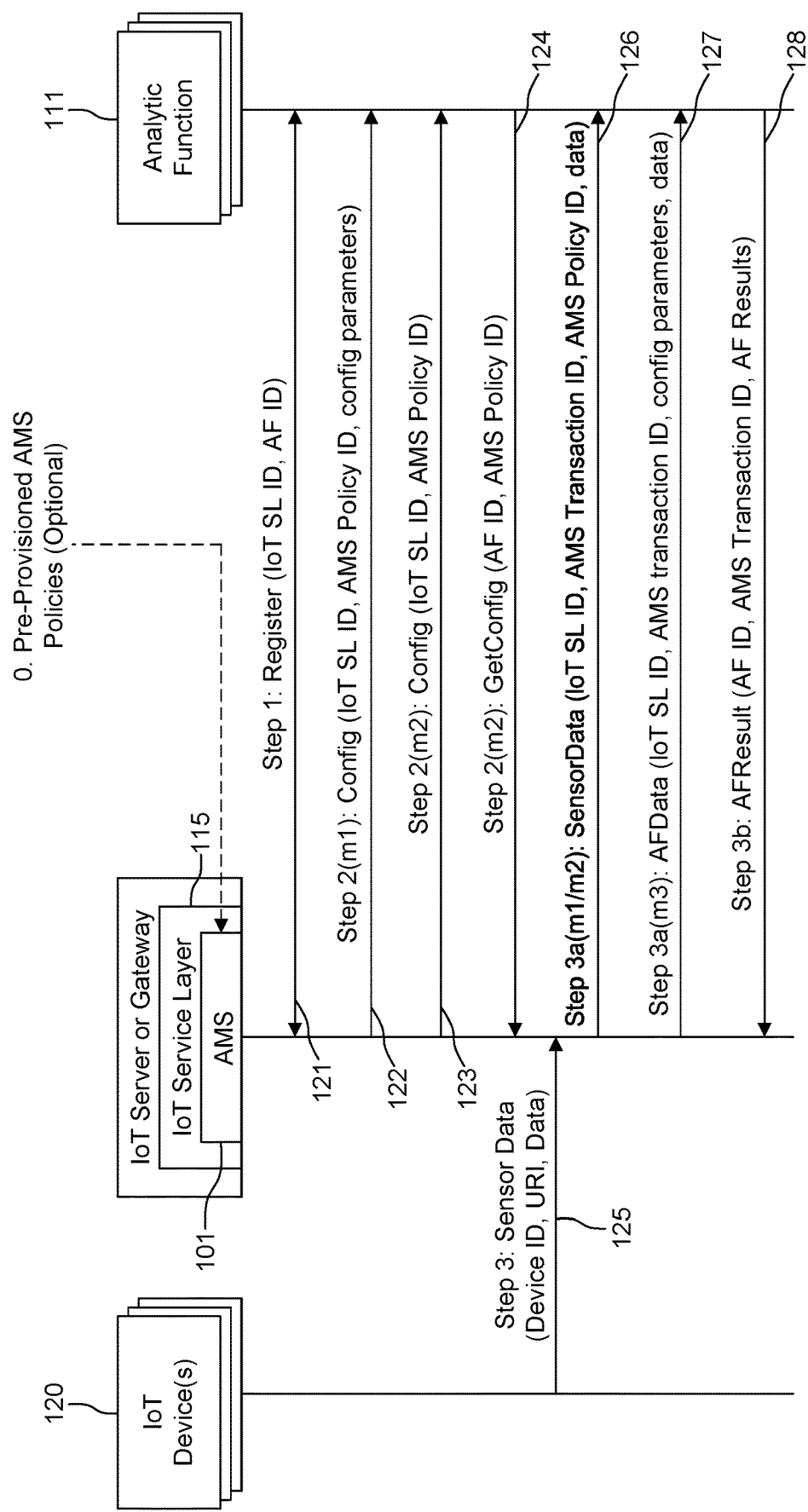
FIG. 16 illustrates an exemplary Communication with Analytic Functions.

It is understood that the entities performing the steps illustrated herein, such as FIG. 16-FIG. 19, may be logical entities. The steps may be stored in a memory of, and executing on a processor of, a device, server, or computer system such as those illustrated in FIG. 30C or FIG. 30D. In an example, with further detail below with regard to the interaction of M2M devices, IoT Device 120 of FIG. 16 may reside on M2M terminal device 18 of FIG. 30A, while IoT SL 115 of FIG. 16 may reside on M2M gateway device 14 of FIG. 30A. Skipping steps, combining steps, or adding steps between exemplary methods disclosed herein (e.g., FIG. 16-FIG. 19) is contemplated FIG. 16 illustrates an exemplary method for communicating with Analytic Functions 111. AMS 101 supports registration, configuration, or communication of data (e.g., data associated with results with one or more AFs as shown in FIG. 16). AMS 101 may be pre-provisioned with an identity of AF 111 that it should communicate with. Additionally, there may be AMS policies pre-configured as well. The information present may be consistent with the configuration methods described below.

At step 121, any specific AF may or may not be dedicated to the IoT SL that it is providing services for, therefore AMS 101 and the AF 111 may establish a relationship amongst themselves. Examples of basic message components, such as IoT SL ID or AF ID, are described below. Additional parameters may be provided, which may depend on the deployment. With regard to IoT SL ID, if AF 111 supports more than a single IoT SL, this identifier may be used to authorize the messages from IoT SL 115. If AF 111 supports only a single IoT SL, then this identifier may not be required. With reference to AF ID, if IoT SL 115 supports more than a single AF, this identifier may be used to authorize the messages from AF 111. If IoT SL 115 supports only a single AF, then this identifier may not be required. The AF ID may be pre-provisioned or provided as part of the registration process. IoT SL 115 may store this identifier for authentication and authorization purposes.

If AF 111 supports only a single IoT SL then this registration process may be simplified to a simple check that AF 111 is present and responsive, which in some deployments may be assumed always true. The registration may be initiated by IoT SL 115 or AF 111.

At step 122, configuration of AF 111 to perform the desired services is specified by the AMS policies in IoT SL 115. IoT SL 115 may have multiple AMS policies that are configured by different IoT entities to support a variety of different IoT Sensors or Data Sources. The policies may be pre-provisioned into IoT SL 115 or they may be specified by IoT SL entities (applications or devices). The following methods are described for communicating the relevant information from an AMS policy, such as those defined herein with regard to the relevant AF. In step 122, the config information that the AF needs is sent to the AF At step 123, the relevant portions of the AMS policy are sent to the AF, along with the AMS Policy ID in a "Policy Configuration Message". This could use the standard protocol of the IoT SL or the standard protocol of the AF or a custom protocol. The AMS service also sends changes to the policy to the AF when they occur. In step 123, the SL sends the AMS policy id to the AF so that the AF can request the needed configuration information from the SL. In the figure, m1(122) and m2(123) refer to method 1 and method 2. Below mentions method 3. Only one method is needed, so step 122 and step 123 may not be present, if step 127 is used. While if step 122 is used, step 123 and step 127 may not be present. Same for step 123.

At step 124, the AMS Policy ID is sent to the AF. The AF may then access the AMS policy as needed from the IoT SL. This is primarily suited to using the standard protocol of the IoT SL. Example: if the AF can use the oneM2M protocol, step 123/124 could be appropriate. However, if the AF is an existing service that is not aware of oneM2M, then step 122 may be more appropriate At step 125, when IoT Data is sent to AF 111 the message may include the relevant information from the AMS policy. This is well suited to very simple analysis such as threshold or value checks. For example, if an IoT Sensor provides temperature values, an AMS policy might be established to generate an "OVER-HEATING" determination, where that determination may be different based on which IoT Sensor the data comes from. The AMS also sends the Policy ID in this message so that the results may be properly processed. Note that method 1 and method 2 (step 126) and method 3 (step 127).

Use of one of the methods that communicate the configuration information may be determined by the capabilities of IoT SL 115 and AF 111. Capabilities may refer to whether the AF may use the SL API (e.g., protocol) or whether the SL has to use the AF API (e.g., protocol).

At step 126, when IoT Data is sent to AF 111, the AMS policy may define what data to send. Some options may not be suitable for some AF and IoT SLs deployments. The message that the AMS sends to the AF may have elements, such as IoT Data to be analyzed, AF configuration, IoT SL ID, or AMS transaction ID, among other things. IoT Data to be analyzed—This could be a single sensor value that is evaluated on its own, i.e. a threshold check, or it could be a single sensor data that the AF analyzes in the context of the history of data that come before this sample, e.g., time series data, or the AMS may send a block of historical data in one or more messages, e.g., partial time series data. AF configuration—This may be represented as the AMS Policy ID or the AF attributes from the AMS policy. IoT SL ID—This is present for the cases that AF 111 supports more than one IoT SL. If AF 111 supports only one IoT SL then this value may be ignored or omitted. AMS transaction ID—a value that AMS 101 generates and sends to AF 111. AF 111 may include the AMS transaction ID in the response (step 128). AMS transaction ID address communication that can be synchronous versus asynchronous, where in the asynchronous case the ID is needed so that the SL can tell what this message refers to.

At step 127, when a result is sent from AF 111 to AMS 101 the message from AF 111 may have data elements, such as AF results, AMS Policy ID, or AMS transaction ID, among other things. AF Results—This is the output of the analysis performed by the AF. In some cases the AF may combine the results with the original data. The exact format of the results are determined by the IoT SL and AF embodiments. The AF may also send aggregated results based on a periodic schedule or result types. AMS Policy ID—This is used to determine how to process the results. It is possible to eliminate this value if synchronous communication is used between the SL and AF 111 or the AMS transaction ID is used to determine this information. AMS transaction ID—a value that AMS 101 generates and sends to AF 111. AF 111 may include this in the response (step 128).

There are two conditions that may trigger sending IoT SL data to AF 111. First is when a new AMS policy is created (see FIG. 17) and second is when new IoT SL Data is created (see FIG. 18). Modification of a policy or IoT SL Data is also an equivalent trigger. In this paper the term modification (update) is assumed to be included when discussing new data being created, unless stated otherwise.

Figure 17:
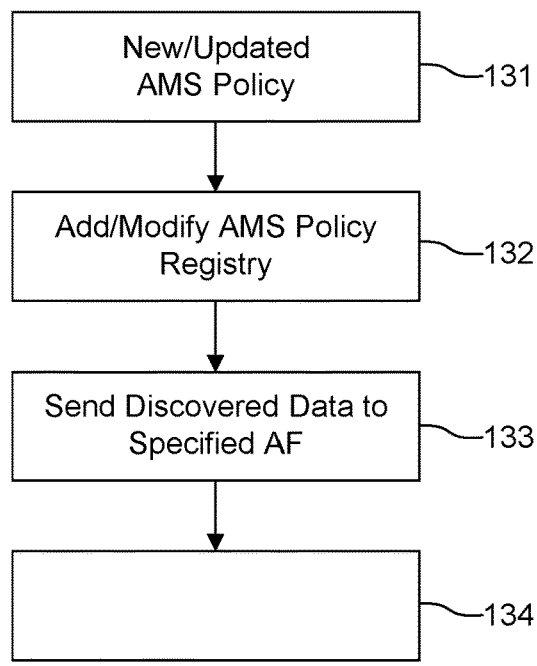
FIG. 17 illustrates an exemplary New AMS Policy.

FIG. 17 illustrates an exemplary method for a new or updated AMS Policy. At step 131, AMS 101 may receive a request to create or update an AMS policy. At step 132, based on the request of step 131, AMS 101 may determine whether the requested AMS policy is for a continuous data mode or periodic schedule data mode (or another data mode). At step 133, based on the data mode (e.g., attribute as in Table 1 and Table 4), updating or creating the requested AMS policy of step 131 and adding the updated or created AMS policy to a registry of AMS Policies that need to be checked each time new IoT SL Data is created (continuous) or based on the provided schedule (periodic schedule). For the periodic schedule data mode, the schedule may be provided during the request of step 131 or based on a subsequent message from an authorized device (not shown). At step 134, AMS 101 may discover existing SL data (e.g., IoT Data) that matches the IoT Data Selection information (also referred herein as criteria or attributes) and may send the appropriate data representation as specified by the data Representation information (also referred herein as criteria or attributes) to AF 111 specified by this AMS policy. This step 134 may be based the data mode, such as a single shot or range of samples.

Figure 18:
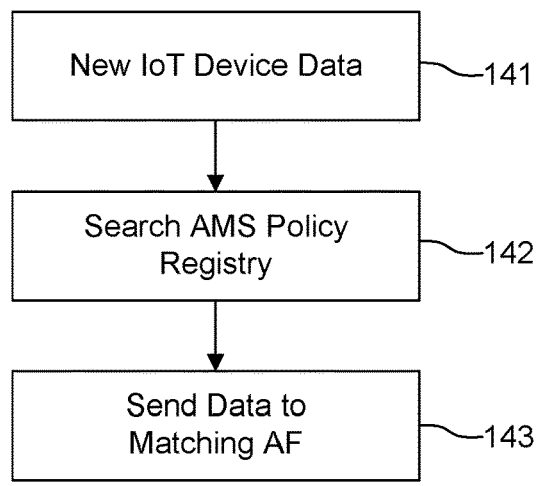
FIG. 18 illustrates an exemplary New IoT Device data.

FIG. 18 illustrates an exemplary method for new IoT Device data. At step 141, IoT SL 115 receives new data from a SL entity, such as a sensor. At step 142, AMS 101 evaluates the new data to determine if it should be sent to one or more AFs based on comparing the meta-information associated with the new data to the AMS policy's IoT Data Selection attributes. At step 143, if an AMS policy indicates that the new data should be sent to a first AF of a plurality of AFs, then AMS 101 sends the appropriate data representation. The data representation may be based on what is specified by the Data Representation attribute. The new data may match more than one AMS policy, in which case the new data is sent to each matching AF 111.

With continued reference to FIG. 18, IoT SL entity may create new data that is associated with a specific AMS policy. If the new data is directly associated with an AMS policy, then AMS 101 may send the new data directly to AF 111 without evaluating the policy's IoT Data Selection attributes. If AMS 101 sends only a portion of the new data, then AMS 101 may be required to maintain the original data until a response is returned from AF 111. AMS 101 may then store the data and AF provided annotation or AMS 101 may remove the new data. IoT SL 115 may respond to the IoT entity that the data was CREATED if a result is stored, or OK if a result is not stored, or OK as soon as AMS 101 receives the AMS targeted data.

Figure 19:
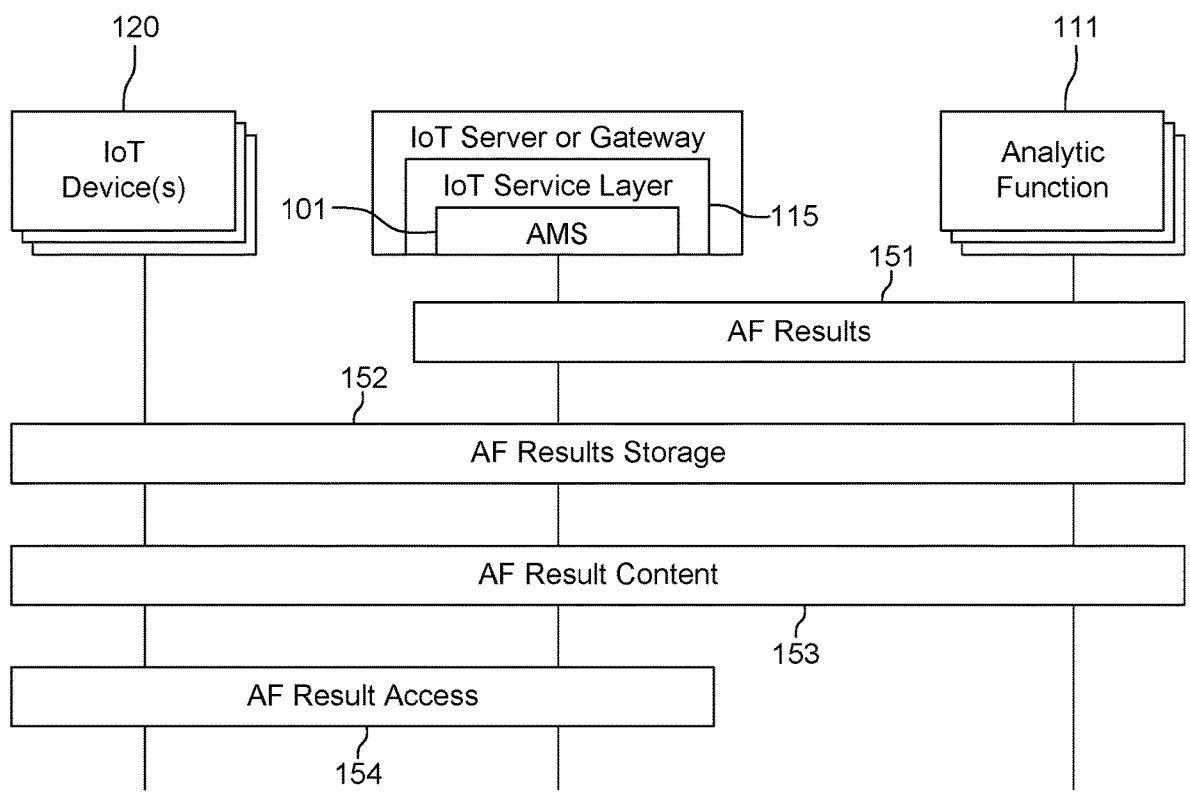
FIG. 19 illustrates an exemplary AMS processing of AF Results.

FIG. 19 illustrates an exemplary AMS 101 processing of AF 111 results. AMS 101 may store the results returned from AF 111 in a configurable manner that allows specification of a structure of storage, annotation of data for better semantic understanding or discovery, or efficient access to data that may have a common characteristic but different sources. For the descriptions below in the Table 2, the following messages may be sent from AF 111 to AMS 101. The first value may represent the identifier of the data that was analyzed (e.g., Image 2) and the remaining values may represent characteristics that were detected (e.g., Image 2, Identified, and ID #2). In some of the data there are no characteristics detected (e.g., Image 5-Image 8).

TABLE 2

"Image 1", "Unidentified"
"Image 2", "Identified", "Id#2"
"Image 3", "Identified", "Id#4"
"Image 4", "Unidentified"
"Image 5"
"Image 6"
"Image 7"
"Image 8"
"Image 9", "Identified", "Id#4"
"Image 10", "Unidentified"

With reference to FIG. 19, at step 151, AMS 101 receives a message, which may include a result from AF 111. AMS 101 determines that a first AMS policy defines the handling of this result using the AMS Policy ID. If the result is the response to a synchronous message between AMS 101 and AF 111 then the AMS policy is known. At step 152, AMS 101 stores the result based on the Result Location attributes of the first AMS policy. In a restful IoT SL this may be the target location of the result. In other implementations this may be a table or document. Once the root location is determined the result structure may be further specified as Fixed or Dynamic. If fixed, then the root location specified is the location where all results may be located. If dynamic, then the root location specified is appended with information returned in the results from AF 111. For example if an image recognition AF provides results in the following manner: 1) identified/unidentified—the AF examines all images provided. If a person is detected in the image it attempts to identify the person in the image; and 2) identity—if the AF identified an image then the identity associated with that image is returned. In this case, the results may be stored in the structure shown in FIG. 20 in which a duplicate of the analyzed data is stored by AMS 101 in a structure determined by the characteristics detected. The root is the starting point for all other parts of the complete location. In the case of "dynamic" the final storage location could be (using the example in the text)<root>/<identified>/<id> or|<root>/<unidentified>.

At step 153, AMS 101 may determine how to store the results from AF 111 based on the AMS policy's Result Content attributes, such as annotation, duplication, or linking. Step 152 describes "where" to store the result. Step 153 describes the "what" to store.

Figure 21:
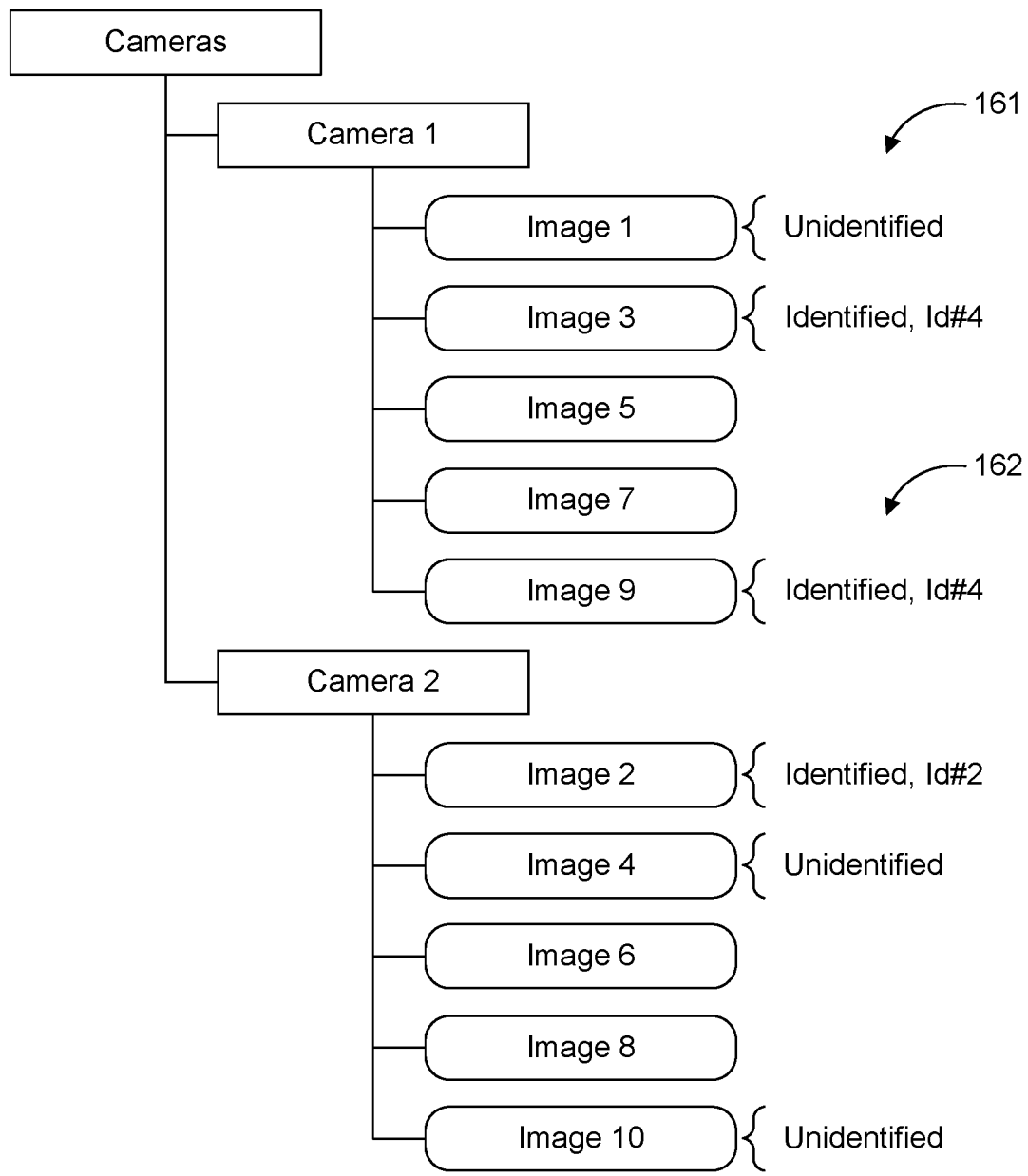
FIG. 21 illustrates an exemplary Result Content Annotation with AF results.

With regard to annotation, the analyzed data, stored in IoT SL 115, may be updated with annotations based on the results provided by AF 111. For example, if the images in Table 2 were stored in a structure based on the camera that provided the images, then the annotations made may be as shown in FIG. 21. The annotations are indicated in the text to the right of the images, such as annotation 161 or annotation 162.

Figure 20:
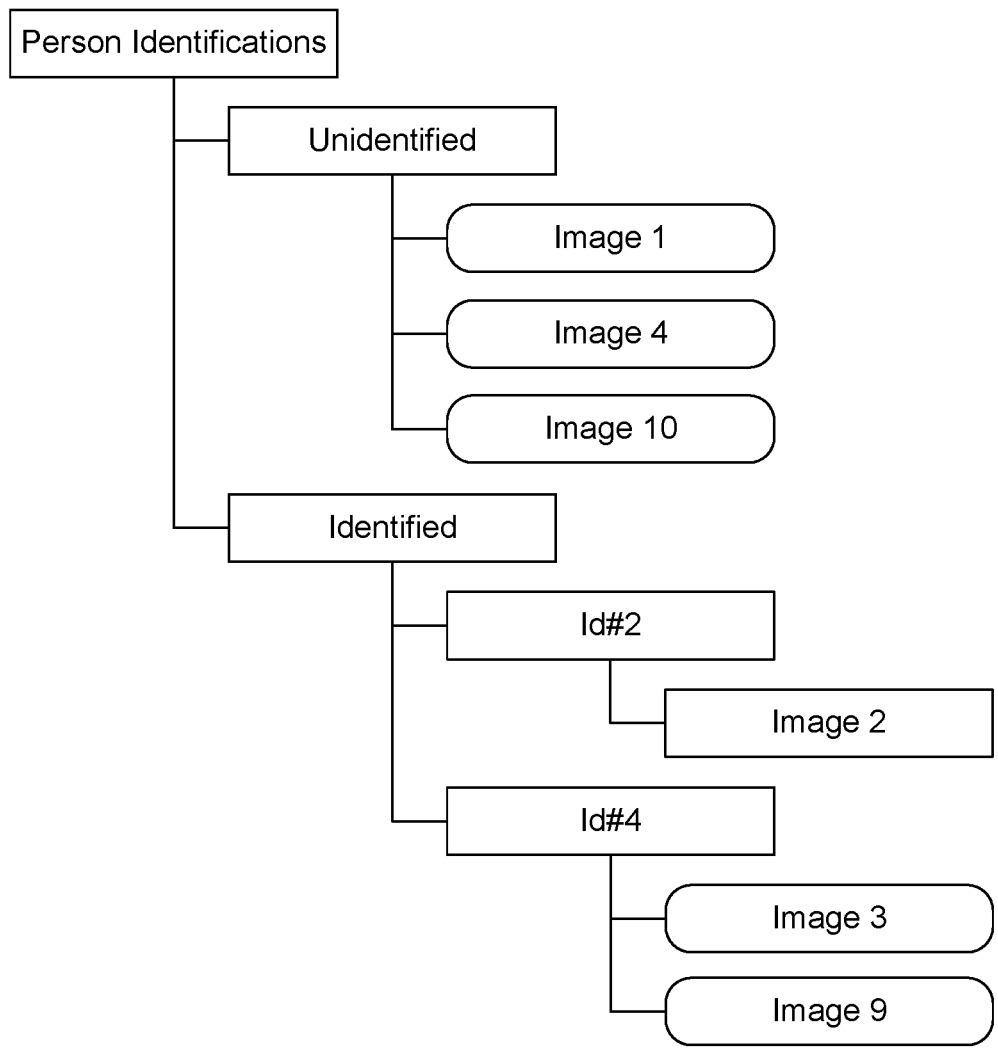
FIG. 20 illustrates an exemplary AMS Results Storage Structure.
Figure 22:
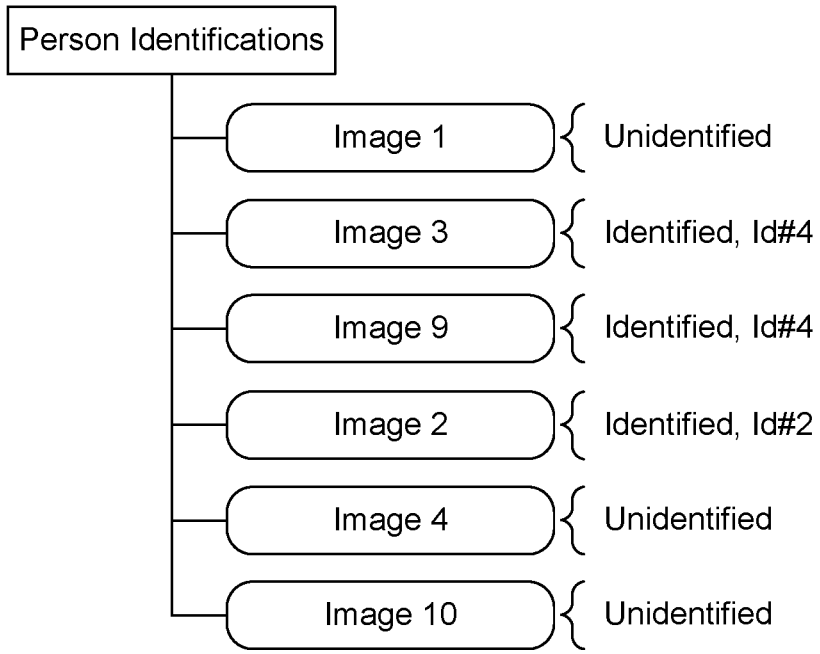
FIG. 22 illustrates an exemplary Result Content Duplicate.

With regard to duplication, the data remains in its original location and a new copy of the data may be stored based on the AMS Policy's Result Location attribute. FIG. 20 shows an example using dynamic structure (the annotations are not shown, but would be the same as shown in FIG. 21). An example of fixed structure is shown in FIG. 22. It is still possible to annotate the original data in addition to creating a duplicate.

Figure 23:
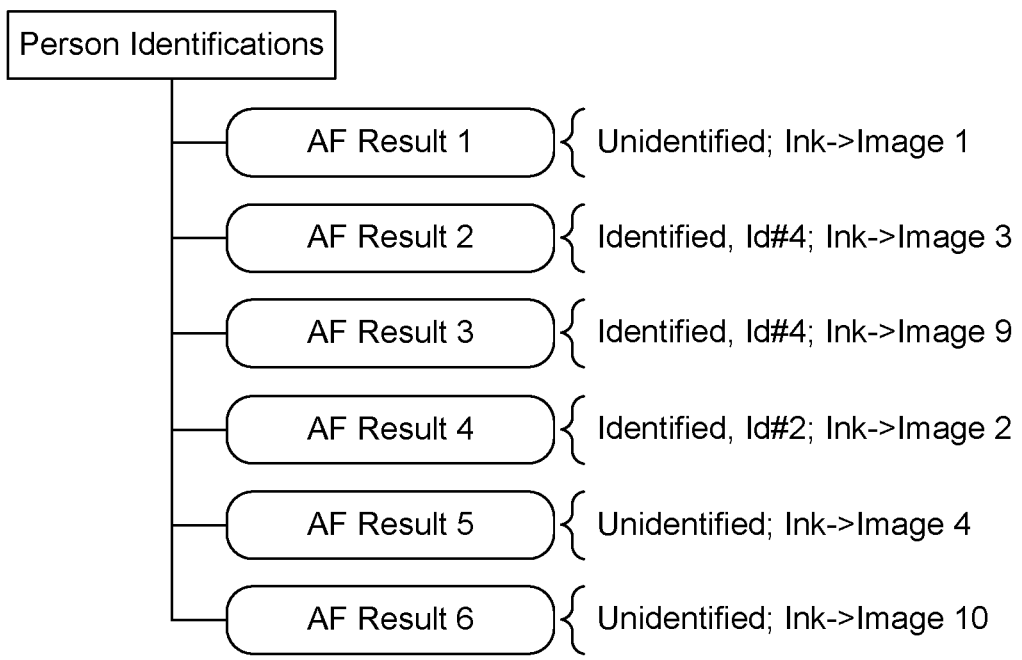
FIG. 23 illustrates an exemplary Result Content Link.

With regard to linking, the data may remain in its original location and a link to the data may be stored based on the AMS Policy's Result Location attribute. This has the benefit of not duplicating the data, but still having the ability to find all persons in a single location. An example is shown in FIG. 23. It is still possible to annotate the original data in addition to creating a link.

Figure 24:
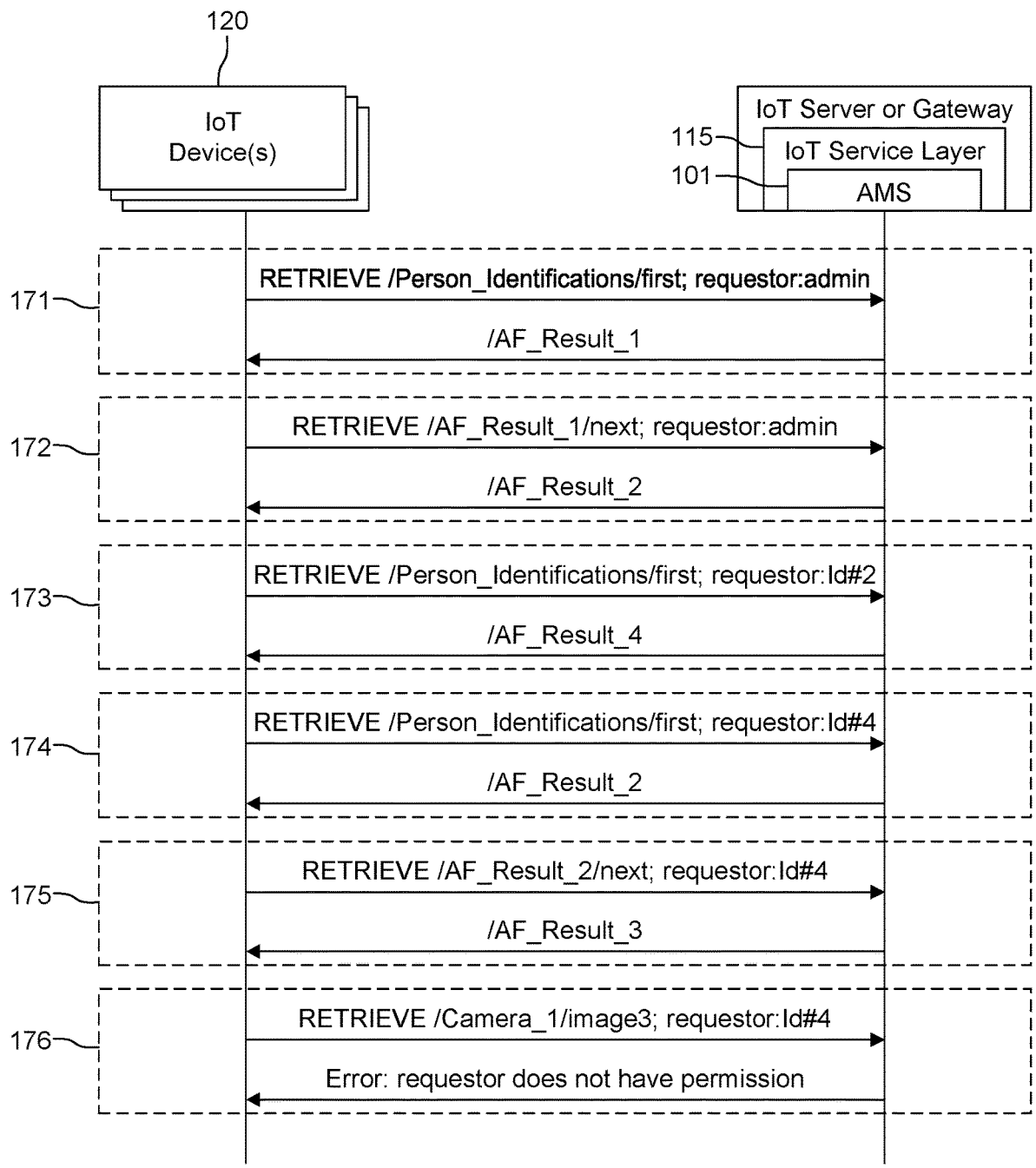
FIG. 24 illustrates an exemplary Accessing AMS Results.

At step 154, AMS 101 makes the results from AF 111 dynamically accessible based on authorization to access each individual data object or resource. This allows for analysis on multiple sources of data to be performed with a single AMS policy yet maintaining the ability to restrict access to appropriate entities. Some examples of the access methods are shown in FIG. 24.

In these requests, it is assumed that only "admin" has permission to access the original data from the cameras. When AMS 101 receives the results from AF 111, the original resources were annotated with information that indicated the analysis results, in these example "unidentified" or "identified" and "id#". Additionally when a result indicated "identified" the linked or duplicate storage methods gave authorization to the "identified" SL entity.

Request 171: Request 171 is made from "admin" and therefore has permission to access all of the results. When the target of the request is the root location for AMS results appended with "/first" then the response is the first data element in that location.

Request 172: When the target of the request is an element below the root location for AMS results appended with "/next" then the response is the data element in that location that follows the target.

Request 173-174: Request 173 is made from "Id#2" and Request 174 is made from "Id#4". When the target of the request is the root location for AMS results appended with "/first" then the response is the first data element in that location that the requestor has permission to access. Therefore the response is AF Result 174 and AF Result 172, respectively.

Request 175: Request 175 is made from "Id#4". When the target of the request is an element below the root location for AMS results appended with "/next" then the response is the next data element in that location that follows the target that the requestor has permission to access. Therefore the response is AF Result 173.

Request 176: Request 176 is made from "Id#4". The requestor was given authorization to access the data through the AMS results, but was not given authorization to access to original source of the data. Therefore the response is a permission denied error.

The AMS Policy's Sort attribute may specify a particular attribute or meta-data of the original resources to sort by, e.g., "data creation time." The sorting would determine the order of the results returned. Methods for accessing "previous" and "last" are also supported.

Figure 25:
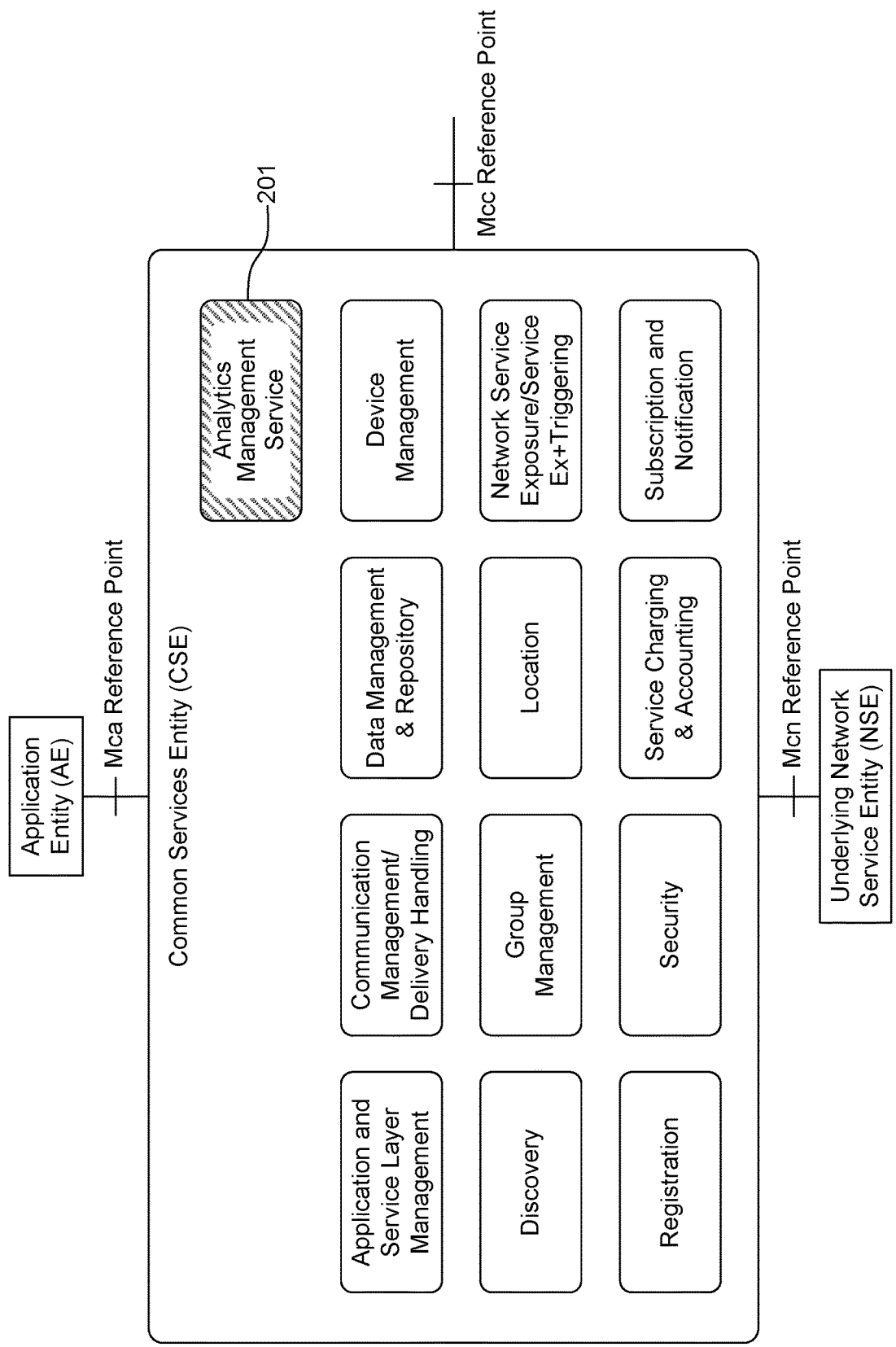
FIG. 25 illustrates an exemplary oneM2M AMS Architecture.

Examples with regard to oneM2M (oneM2M TS-0001 oneM2M Functional Architecture) examples are disclosed below. Within the oneM2M architecture, AMS 201 may be realized as a new Common Service Function (CSF) of a Common Services Entity (CSE) as shown in FIG. 25. This new CSF may be used to enable AMS 201 support in a oneM2M system.

In a oneM2M example, AMS 201 CSF may support a Analytics Function resource. The attributes of an <AF> resource may be READ ONLY for AEs or CSEs and may be provisioned into AMS 201 CSF using out-of-band mechanisms such as device management. An <AF> resource may support attributes as defined in Table 3 which are selected from the AMS Policy attribute definitions associated with AF configuration attributes disclosed herein.

TABLE 3

<AF> Resource Attributes

| Attribute | Description |
| --- | --- |
| afId | Used by the SL to determine where messages should be sen tand how to receive responses. For example, if the AF may be a non-oneM2M service messages may use the Mcn interface and require appropriate connection establishment. The afId may be referenced in each <AMSPolicy> |
| configurationDefinitionRef | This may include an identifier reference (URI) to the <flexContainer> schema definition that defines the parameters that need to be specified to configure an AF. This schema may be used by the CSE to validate the syntax of a <flexContainer> resource that is created to configure an <AF>. This schema also includes a description of the analytics service provided. |

In a oneM2M example, AMS 201 CSF may maintain specific data analytics policy information in a <AMSPolicy> resource. A <AMSPolicy> resource may be created, updated, and deleted by an AE or CSE. An <AMSPolicy> resource may support attributes as defined in Table 4 which are based on the AMS Policy attributes defined herein.

TABLE 4

<AMSPolicy> Resource Attributes

| Attribute | Description |
| --- | --- |
| afRef | A reference to an <AF> resource |
| configurationRef | This may include an identifier reference (URI) to the <flexContainer> resource that may include the parameters that need to be specified to configure the AF as indicated by afRef. The containerDefinition specified in the referenced <flexContainer> should be the same URI specified in the referenced <AF> configurationDefinitionRef. |
| dataSources | This attribute indicates the list of target resourceIDs of <container>, <timeSeriesContainer> or <flexContainer> for which the AMS may send data to the AF indicated by afRef. |
| DataMode | Continuous, singleShot, or both.<br>   If the value is continuous the Hosting CSE may send future created resources with targetURI matching those in dataSources for analysis.<br>   If the value is singleShot the hosting CSE may send child resources of the dataSources for analysis.<br>   If the value is both the Hosting CSE may send current and future child resources of the dataSources for analysis. |
| resultStorageMode | Fixed or Dynamic<br>   If the value is Fixed the results may be stored in the location specified by resultStorageLocation.<br>   If the value is Dynamic the results may be stored in a <container>, <timeSeriesContainer>, or <flexContainer> where the resourceName is set by the Hosting CSE to match the returned characteristic. If multiple characteristics are returned then equivalent child containers may be created. |

TABLE 4-continued

<AMSPolicy> Resource Attributes

| Attribute | Description |
|---|---|
| resultStorageLocation | The root location for the storage of the results from the AF. If left empty the ResultContent attribute may be Annotation. |
| resultStorageContent | Annotation, Duplicate, Link.<br>If the value is annotation the hosting CSE may create a child <semanticDescriptor> resource under the original target resource containing the detected characteristics.<br>If the value is Duplicate the hosting CSE may create a copy of the original resource and child <semanticDescriptor> resources containing the detected characteristics.<br>If the value is Link the hosting CSE may create a new <link> resource with the link attribute referencing the original resource and child <semanticDescriptor> resources containing the detected characteristics. |

In a oneM2M example, the AMS CSF may support a Link Container resource. The attributes of a <linkResource> resource may allow for an SL entity to easily traverse resources from multiple different sources, giving access to limited or specific data without the need to give access to all data. For example, access may be given to only a specific <contentInstance> instead of an entire <container> and all of the child resources. The virtual resources of a <linkResource> may allow more flexible navigation of the child resources of the container. A <linkResource> resource may be created, updated, or deleted by an AE or CSE. A <linkResource> resource may support attributes as defined in Table 5 which may be based on the AMS Access methods defined herein (e.g., FIG. 19). A <linkResource> may be a child of a content holding resource, such as a <container>, <timeSeriesContainer> or <flexContainer>. This resource may also be used to make accessing other resource types more efficient, such as allowing a single <subscription> to be used for multiple "subscribed-to" resources.

TABLE 5

<linkResource> Resource child resources and attributes

| <childResource>/Attribute | Description |
|---|---|
| <first> | When a request targets this virtual resource, the Hosting CSE may return the first <linkResource> in the targeted parent container. The first <linkResource> may be dynamically determined based on authorization to access the data and a filter criteria applied to the request. |
| <next> | When a request targets this virtual resource, the Hosting CSE may return the next <linkResource> in the targeted parent container. The next <linkResource> may be dynamically determined based on authorization to access the data and a filter criteria applied to the request. |
| <previous> | When a request targets this virtual resource, the Hosting CSE may return the previous <linkResource> in the targeted parent container. The previous <linkResource> may be dynamically determined based on authorization to access the data and a filter criteria applied to the request. |
| <last> | When a request targets this virtual resource, the Hosting CSE may return the last <linkResource> in the targeted parent container. The last <linkResource> may be dynamically determined based on authorization to access the data and a filter criteria applied to the request. |
| link | Provides the URI to the original resource. When <linkResource> resource is retrieved the Hosting CSE may retrieve the resource referenced by this attribute. |
| accessControlPolicyIDs | The list of identifiers (e.g., an ID or a URI) of an <accessControlPolicy> resource or AE-ID or CSE-ID. When present, these privileges may be in addition to the accessControlPolicyIDs listed in the linked resource.<br>If this attribute indicates an AE-ID or CSE-ID then the permission may be READ ONLY.<br>If this attribute is not present the original resource accessControlPolicyIDs may apply. |

Figure 26:
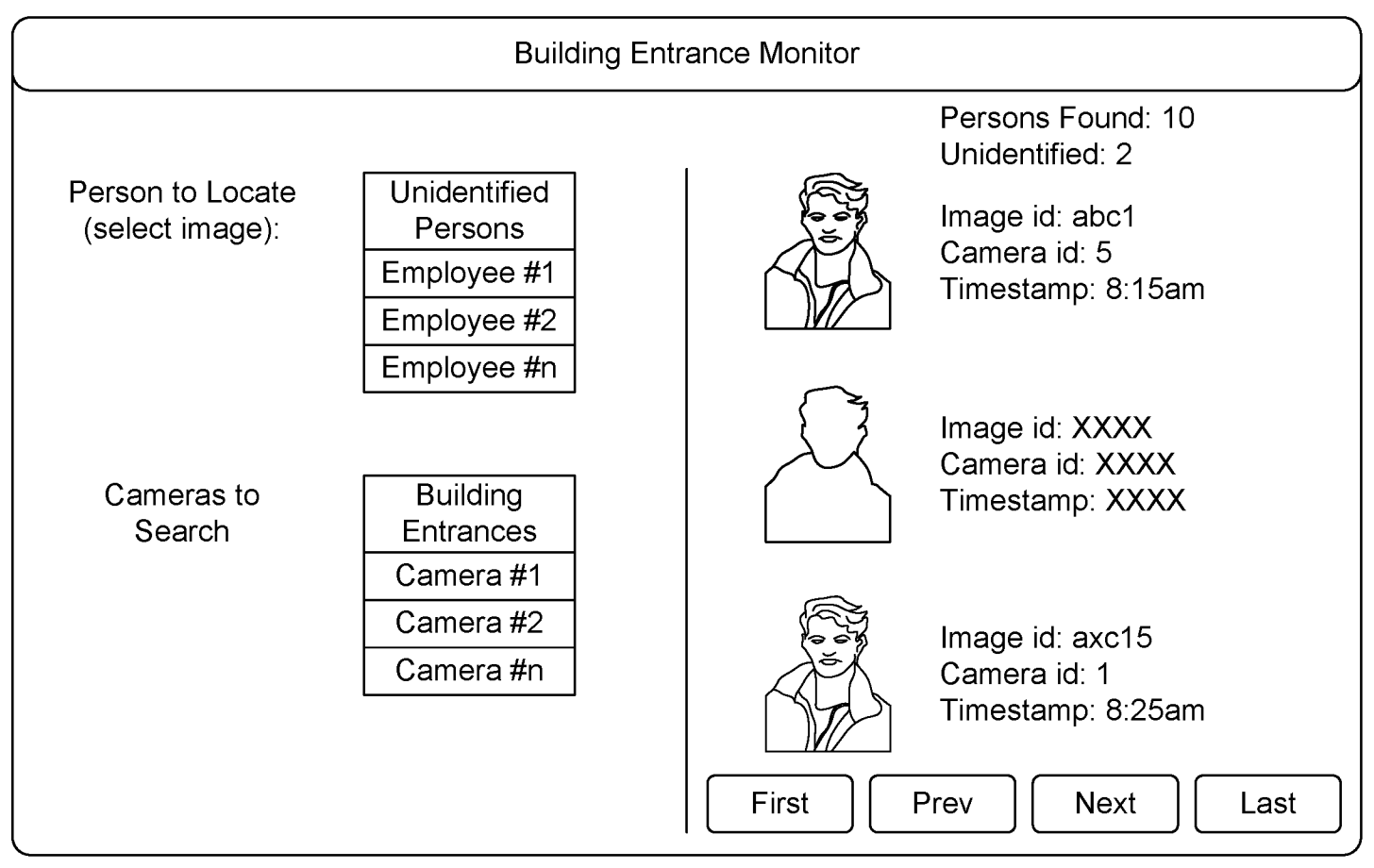

Analytics Management Service GUI—The sample application provides a security monitoring service for a building, such as an office building. The left side of FIG. 26 shows drop down selection boxes that may be used to populate an AMS Policy while the right side shows the results with one of the images unavailable because of authorization properties of the images. The example demonstrates the desired result to show the "Unidentified" persons using inputs from cameras located at all "Building Entrances". This user may not be allowed access to the original images, but when an "unidentified" person is detected, the user is given authorization to view the image. This example shows two "Unidentified" persons and the remaining persons detected are not visible.

Figure 27:
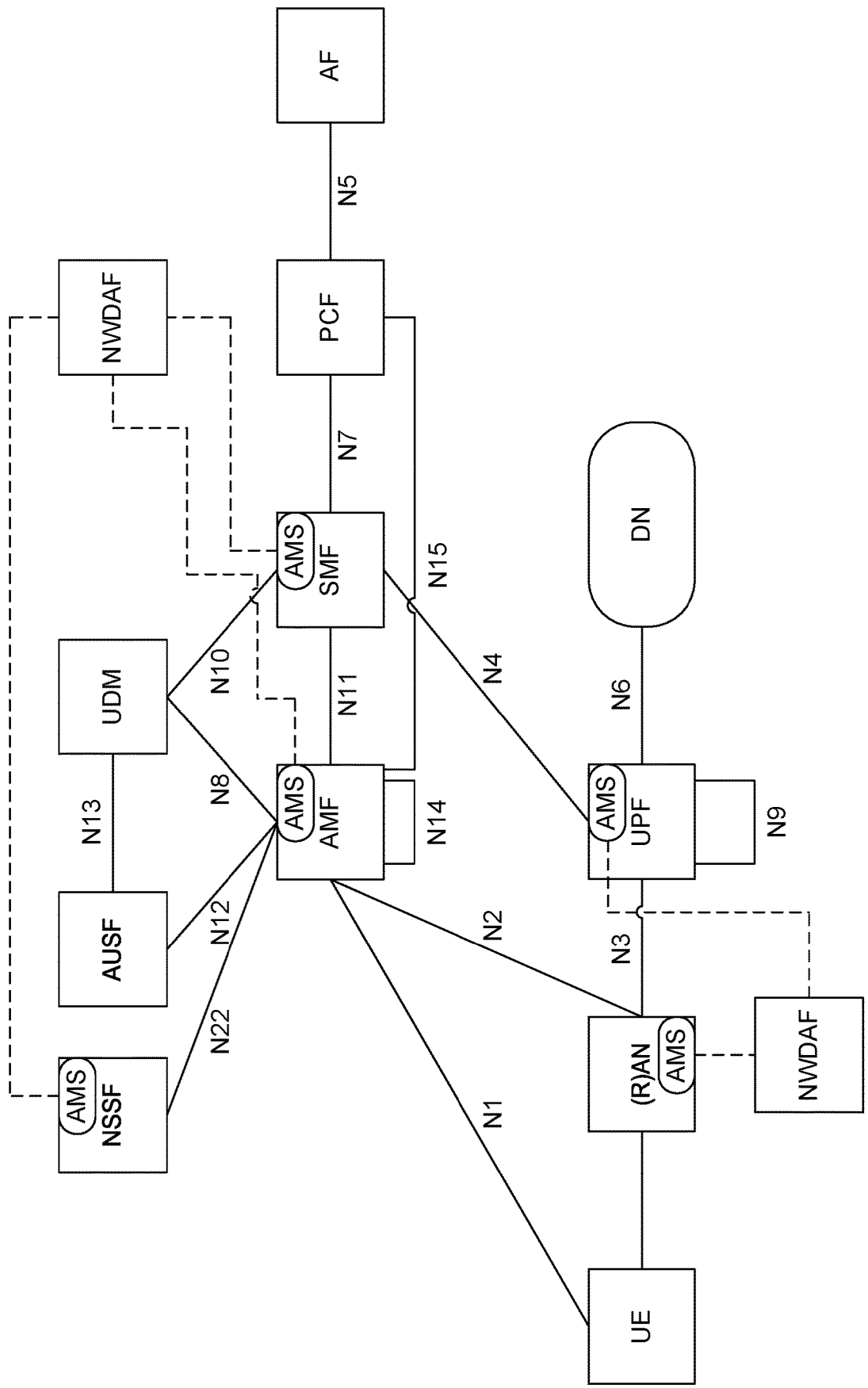
FIG. 27 illustrates an exemplary AMS Deployed in the 5GC.

In a 3GPP embodiment, the AMS may exist within a 5G core network function (5GC NF), such as the AMF, SFM, or UPF. It may also exist with the RAN. Each AMS instance may be used to make determinations about what data to send to the NWDAF. Where the AMS may be instantiated within the 5GC as shown in FIG. 27. The dotted lines show the connection between the 5GC NFs and NWDAF. Of course, the AMS may also exist with network functions beyond what is shown in FIG. 27, such as the UDM, AUSF, PCF, etc.

A 5GC Network Function that supports AMS functionality may expose an AMSPolicyCreation Service. Another NF (e.g., the NWDAF) may invoke the AMSPolicyCreation service to provide the 5GC Network Function with an AMS Policy (e.g. the policy that is shown in Table 1). For example, a 5GC NF such as the AMF, SFM, or UPF may support the AMSPolicyCreation service. The NWDAF may invoke this AMSPolicyCreation service to provide the 5GC NF with a policy that describes what data should be sent to the NWDAF. The IoT Data Selection Criteria, as described herein, may further include the identity of the UE(s) or groups of UE(s) that the NWDAF would like information about or the NWDAF may indicate that it wants information related to all UEs or certain types of UEs or only roaming or non-roaming UEs. The Data Type in the IoT Data Selection Criteria may indicate that that the NWDAF desires information about mobility events (registration updates, configuration updates, etc.), session events (e.g., service requests, PDU session requests, etc.), what power savings modes are configured, what communication patterns are configured, etc. When the NWDAF invokes the service, it may further indicate where the data should be sent (e.g., a particular RESTful resource in the NWDAF). Note that the AMSPolicyCreation may be invoked by other NF's such as the PCF or by an Application Function that exposes a management GUI to a network administrator.

When the 5GC NF (e.g., SMF, AMF, or UPF) detects an event or data that matches the criteria that was indicated in the policy that was provided when the AMSPolicyCreation was invoked, the 5GC NF may take action to store the results. How the results are stored depends on the Results Storage preferences (e.g., Result Location, Result Content, or Result Accessibility) that were indicated in the AMS policy. The AMS policy may indicate where results should be stored and if the 5GC NF should provide the results, or a link to the results. The policy may further indicate how often the 5GC NF should report updated results to the AMSPolicyCreation invoker (e.g., how long to aggregate data before providing data to the AMSPolicyCreation invoker).

A 5GC Network Function that supports AMS functionality may expose an AMSAnalyticsBasedConfiguration Service. Another NF (e.g., the NWDAF) may invoke the AMSAnalyticsBasedConfiguration service to provide the 5GC NF with updated configuration information based on data that was obtained as a result of invoking the AMSPolicyCreation service with the 5GC NF and other 5GC NF's. The AMSAnalyticsBasedConfiguration may be a specialized service based on the NF type. Table 6 shows examples of how various network functions may be configured based on analytic information.

TABLE 6

| Examples of how the NWDAF may Configure 5GC Network Functions. | |
|---|---|
| 5GC NF | Example Usage |
| AMF | An AMF AMSAnalyticsBasedConfiguration service may allow the invoker to limit the number of UEs that are connected to the network or connected to particular network slice instances. The limits may alternatively be based on the type of UE or whether the UE belongs to certain groups.<br>The AMSAnalyticsBasedConfiguration service may also be used to provide the AMF with preferences to indicate what RAN node is used to contact a UE, for example whether a UE should be paged via the cellular network our sent notifications via a non-3GPP network. |
| SMF | An SMF AMSAnalyticsBasedConfiguration service may allow the invoker to limit the number of PDN connections that are associated with certain UPFs or provide the SMF with guidance about what UPFs should be used, what UPFs are available, UPF capabilities, and when PDN connections should be moved from one UPF to another UPF. |
| UPF | A UPF AMSAnalyticsBasedConfiguration service may allow the invoker to provide updated packet inspection and forwarding rules. |

Figure 28:
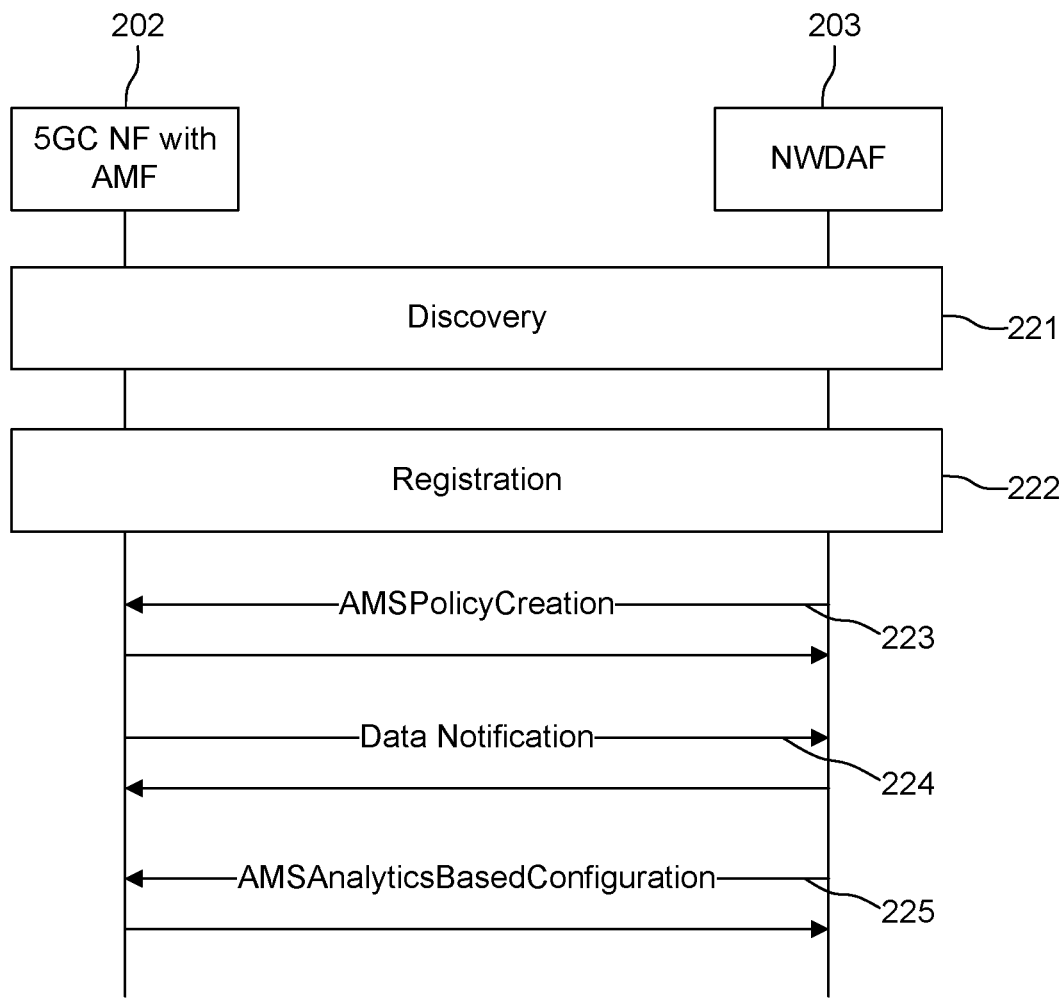
FIG. 28 illustrates an exemplary Communication with Analytic Functions.

FIG. 28 shows how, in a 5GC for example, communication between 5GC NF's 202 and NWDAF 203 may take place to fulfill the functionality that was described herein (e.g., FIG. 16, FIG. 19, or FIG. 20). The procedure of FIG. 28 provides an example of how the 3GPP 5GC Analytics Function (e.g., NWDAF 203) may communicate with 5GC Network Functions 202. At step 221, if the 5GC NFs 202 and NWDAF 203 are not preconfigured to know to communicate with each other, a 5GC NF 202 may use the NRF to discover an NWDAF 203 or the NWDAF 203 may use the NRF to discover 5GC NFs 202. In step 222, the NWDAF may establish a connection with the 5GC NF (or vice versa).

With continued reference to FIG. 28, in step 223 the NWDAF 203 may invoke the 5G NF's 202 AMSPolicyCreation service to configure the 5GC NF 202 with data analytics collection polies as described herein. In step 224, the 5GC NF 202 may send data to the NWDAF 203 based on the policies that were configured in step 223. In this example of FIG. 28, the 5GC NF 202 may push the collected data to NWDAF 203, but other communication models may be used to send data from the 5GC NF 202 to NWDAF 203 as described herein (e.g., NWDAF 203 may make requests to 5GC NF 202 to retrieve data as shown in FIG. 24). In step 225, NWDAF 203 may invoke the AMSAnalyticsBasedConfiguration service to configure 5GC NF 202 based on the data that has been collected from 5GC NF 202 and other 5GC NFs.

Table 7 includes abbreviations and Table 8 includes exemplary definitions of terms.

TABLE 7

Abbreviations

| | |
|---|---|
| ADN | Application Dedicated Node |
| AF | Analytic Function |
| AE | Application Entity |
| API | Application Programming Interface |
| AMF | Access and Mobility Management Function |
| ASN | Application Service Node |
| AUSF | Authentication Function |
| CSE | Common Service Entity |
| CSF | Common Service Function |
| IN | Infrastructure Node |
| IoT | Internet of Things |
| IP | Internet Protocol |
| M2M | Machine to Machine |
| MN | Middle Node |
| NoDN | Non-oneM2M Node |
| NRF | Network Repository Function |
| NSE | Network Service Entity |
| NSSF | Network Slice Selection Function |
| NWDAF | Network Data Analytics Function |
| PCF | Policy Control Function |
| PoA | Point of Access |
| RAN | Radio Access Network |
| ROA | Resource Oriented Architecture |
| SL | Service Layer |
| SMF | Session Management Function |
| UDM | User Data Management |
| UPF | User Plane Function |
| URI | Uniform Resource Identifier |

TABLE 8

Definitions

| | |
|---|---|
| IoT Data | Data generated by an IoT entity. IoT Data may be stored in an IoT service layer resource within an IoT service layer |
| IoT entity | An IoT application or IoT device or a user of an IoT application or IoT device. |
| IoT service | A software functionality that provides capabilities to IoT entities (e.g., data management, security, or device management) |
| IoT service layer | A software layer consisting of a collection of IoT services that are used by devices, applications and users and hosts resources |
| IoT service layer resource | An addressable object that contains information (e.g. data) and that is hosted by an IoT service layer |
| IoT service layer application | A software entity that registers to an IoT service layer and performs application specific functionality pertaining to use cases (e.g. sensing, actuating) |
| IoT service layer device | An entity that can host one or more applications and that registers to an IoT service layer |
| IoT service layer entity | An IoT entity that enrolls or registers to an IoT Service Layer. |
| Network Function (NF) | An NF is a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure. |
| Network Slice Template | This refers to a set of NW functions that support certain application profile(s). |
| Network Slice Instance | An instantiation of a NW Slice Template. |
| Network Data Analytics Function (NWDAF) | NWDAF represents operator managed network analytics logical function. NWDAF may provide slice specific network data analytics to the PCF. NWDAF may provide network data analytics to PCF on a network slice level and the NWDAF may not be required to be aware of the current subscribers using the slice. It is also possible that NWDAF provides other types of network data analytics to network functions in addition to the PCF within the mobile core network. |

Without in any way unduly limiting the scope, interpretation, or application of the claims appearing herein, a technical effect of one or more of the examples disclosed herein is to provide adjustments to use or management of analytics processing. Disclosed herein are methods, systems, and apparatuses that may enable a Service Layer (SL) to support analysis of IoT data (which may be more efficient than conventional system) and may enable shared access to information generated by the analysis. The Analytics Management Service described herein may allow SL entities to configure Analytics Functions for many different IoT sources of data and organize the results in a customizable manner that may allow easier access and more granular authorization.

Figure 29:
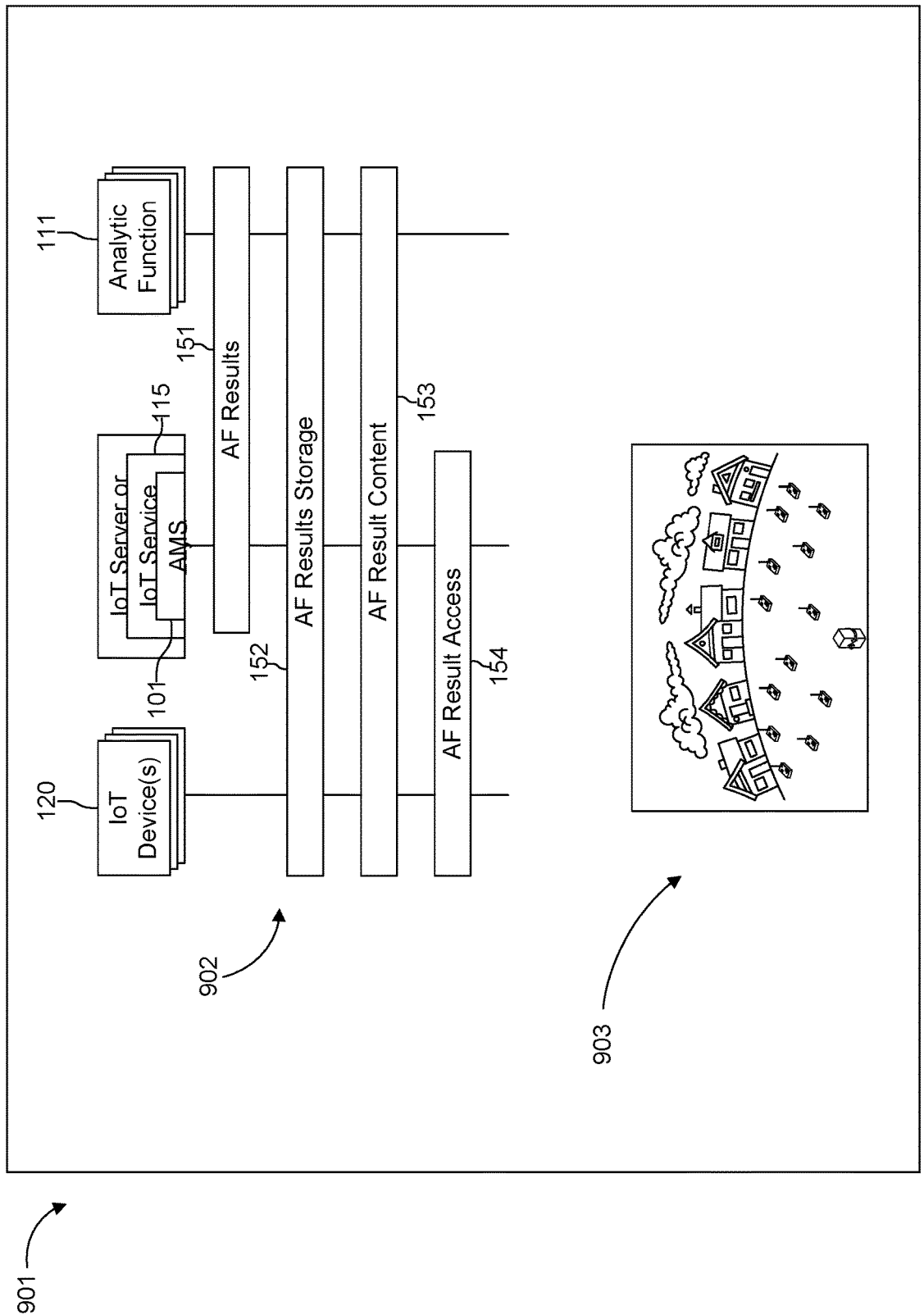
FIG. 29 illustrates an exemplary display (e.g., graphical user interface) that may be generated based on the methods and systems disclosed herein.

FIG. 29 illustrates an exemplary display (e.g., graphical user interface) that may be generated based on the methods and systems discussed herein. Display interface 901 (e.g., touch screen display) may provide text in block 902 associated with analytics of IoT data, such as the parameters of Table 1 through Table 8. In another example, progress of any of the steps (e.g., sent messages or success of steps) discussed herein may be displayed in block 902. In addition, graphical output 903 may be displayed on display interface 901. Graphical output 903 may be the topology of the devices (e.g., IoT devices 120), a graphical output of the progress of any method or systems discussed herein, or the like.

Figure 30A:
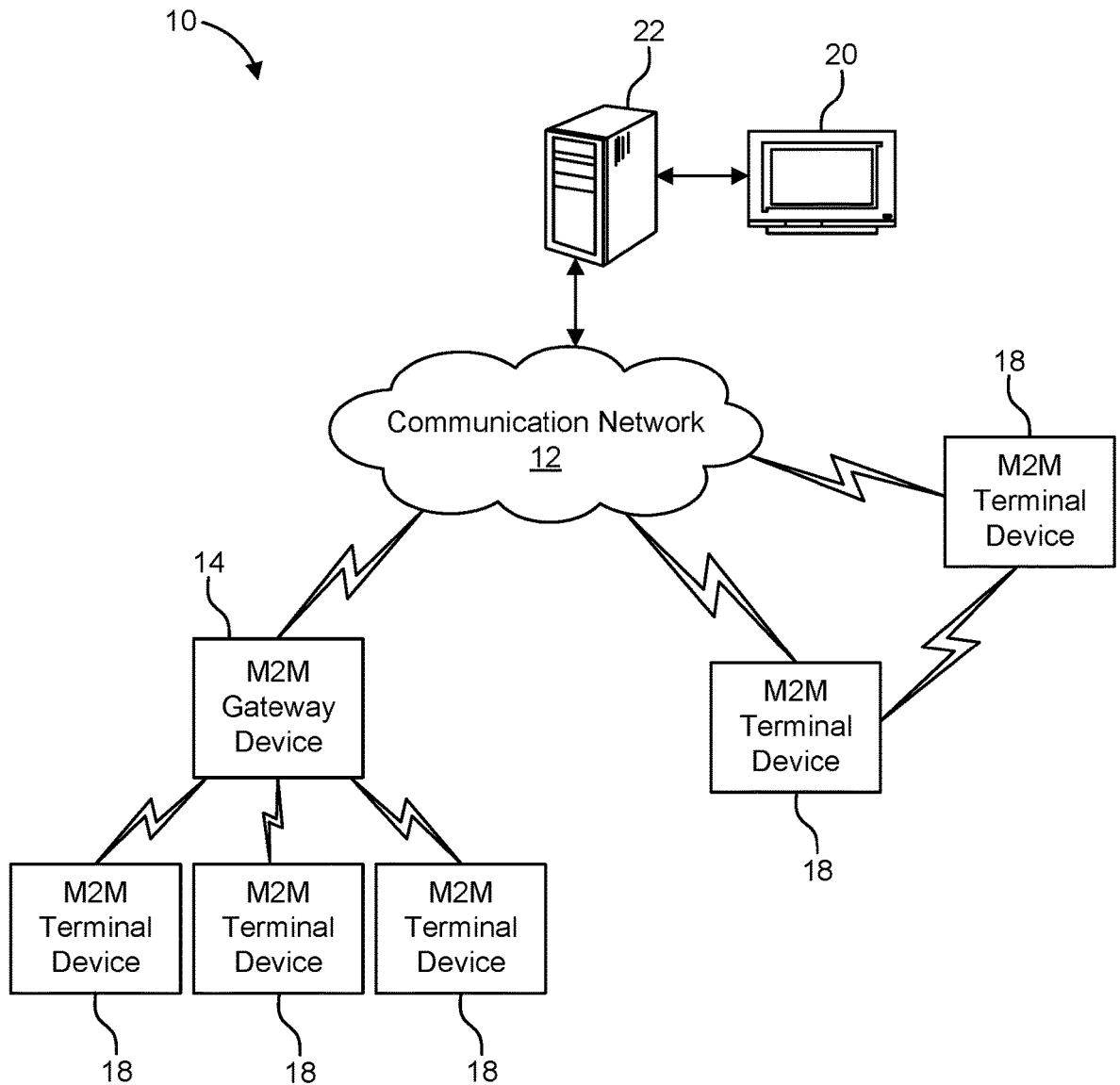
FIG. 30A illustrates an exemplary machine-to-machine (M2M) or Internet of Things (IoT) communication system in which the disclosed subject matter may be implemented.

FIG. 30A is a diagram of an example machine-to machine (M2M), Internet of Things (IoT), or Web of Things (WoT) communication system 10 in which one or more disclosed concepts associated with enabling analytics of IoT data may be implemented (e.g., FIG. 13-FIG. 29 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 30A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 30A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 30B:
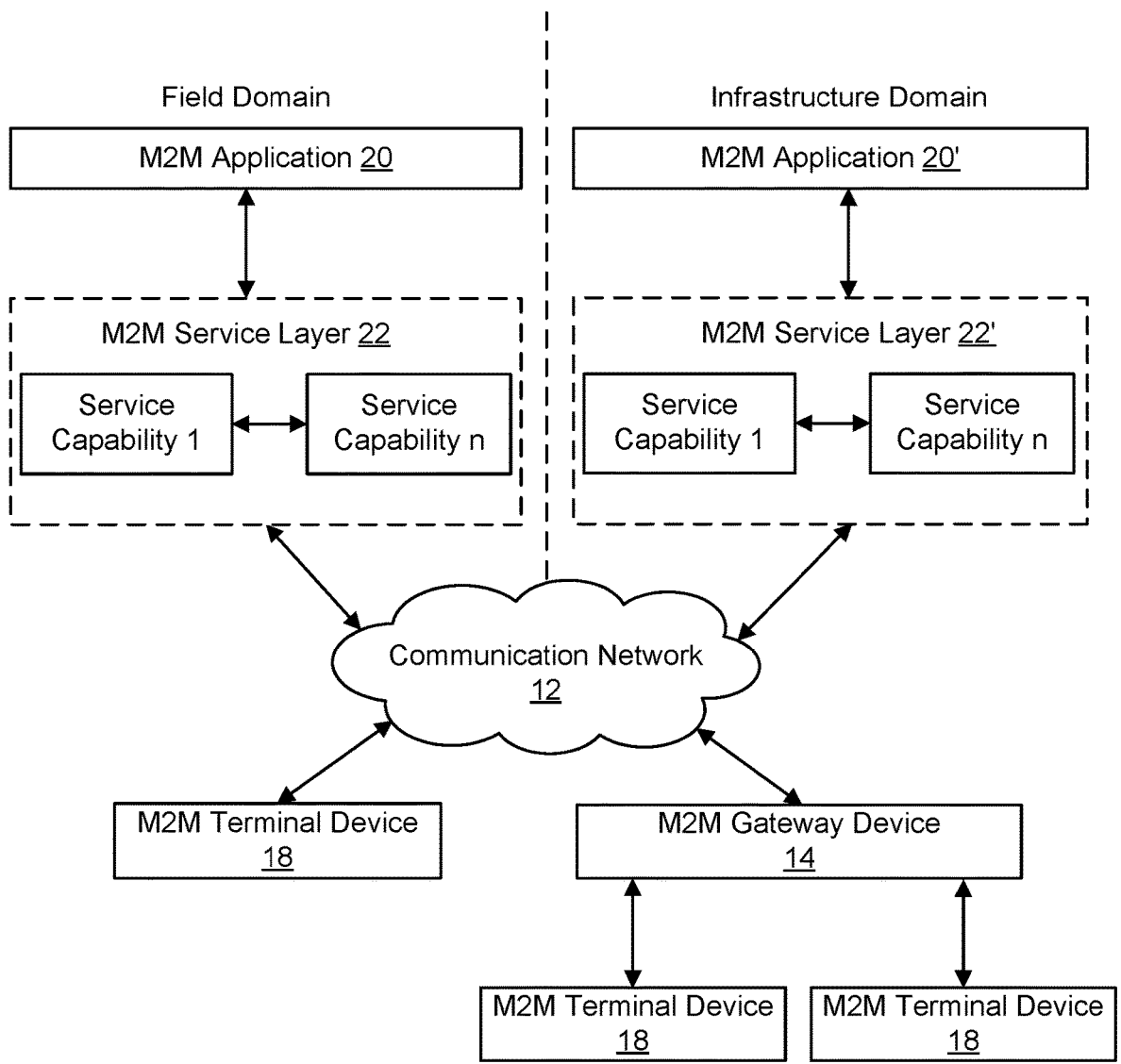
FIG. 30B illustrates an exemplary architecture that may be used within the M2M/IoT communications system illustrated in FIG. 30A.

Referring to FIG. 30B, the illustrated M2M service layer 22 (e.g., IoT SL 115 as described herein) in the field domain provides services for the M2M application 20 (e.g., IoT device 120), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/computer/storage farms, etc.) or the like.

Referring also to FIG. 30B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using enabling analytics of IoT data, as disclosed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The enabling analytics of IoT data of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the enabling analytics of IoT data of the present application. The oneM2M service layer supports a set of Common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the enabling analytics of IoT data of the present application may be implemented as part of an M2M network that uses a Service Oriented Architecture (SOA) or a resource-oriented architecture (ROA) to access services such as the <enabling analytics of IoT data of the present application.

As disclosed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 30C:
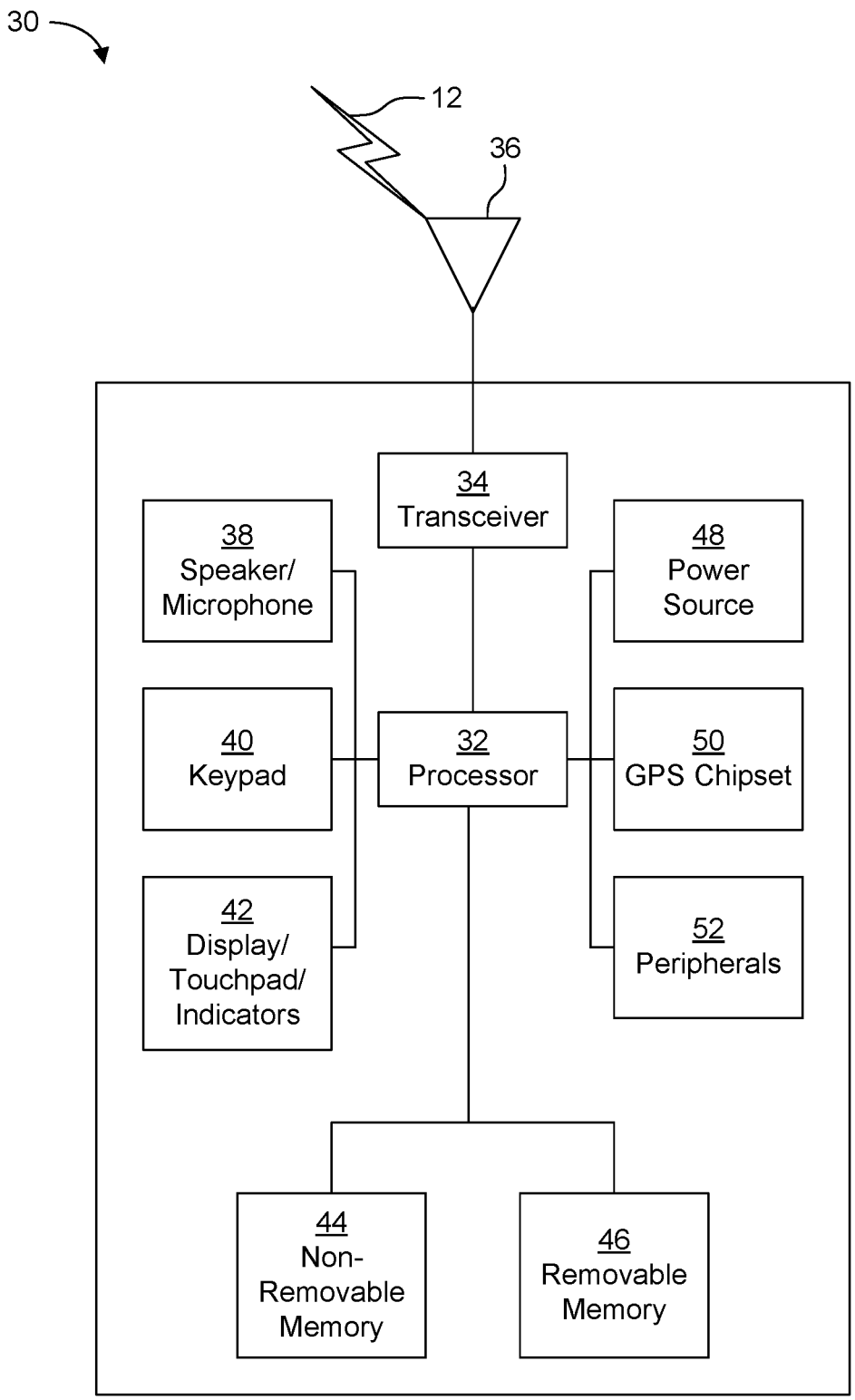
FIG. 30C illustrates an exemplary M2M/IoT terminal or gateway device that may be used within the communications system illustrated in FIG. 30A.

FIG. 30C is a system diagram of an example M2M device 30, such as an M2M terminal device 18 (which may include IoT device 120) or an M2M gateway device 14 (which may include one or more components of FIG. 16), for example. As shown in FIG. 30C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., IoT device 120, IoT server 116, and others) may be an exemplary implementation that performs the disclosed systems and methods for enabling analytics of IoT data.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled with the transceiver 34, which may be coupled with the transmit/receive element 36. While FIG. 30C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 30C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the enabling of analytics of IoT data in some of the examples described herein are successful or unsuccessful (e.g., routing to or selection of AFs, etc.), or otherwise indicate a status of enabling analytics of IoT data and associated components. The control lighting patterns, images, or colors on the display or indicators 42 may be reflective of the status of any of the method flows or components in the FIG.'s illustrated or discussed herein (e.g., FIG. 13-FIG. 28, etc). Disclosed herein are messages and procedures of enabling analytics of IoT data. The messages and procedures may be extended to provide interface/API for users to request analytics related information via an input source (e.g., speaker/microphone 38, keypad 40, or display/touchpad 42). In an addition example, there may be a request, configure, or query of analytics information, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled with the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled with other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 30D:
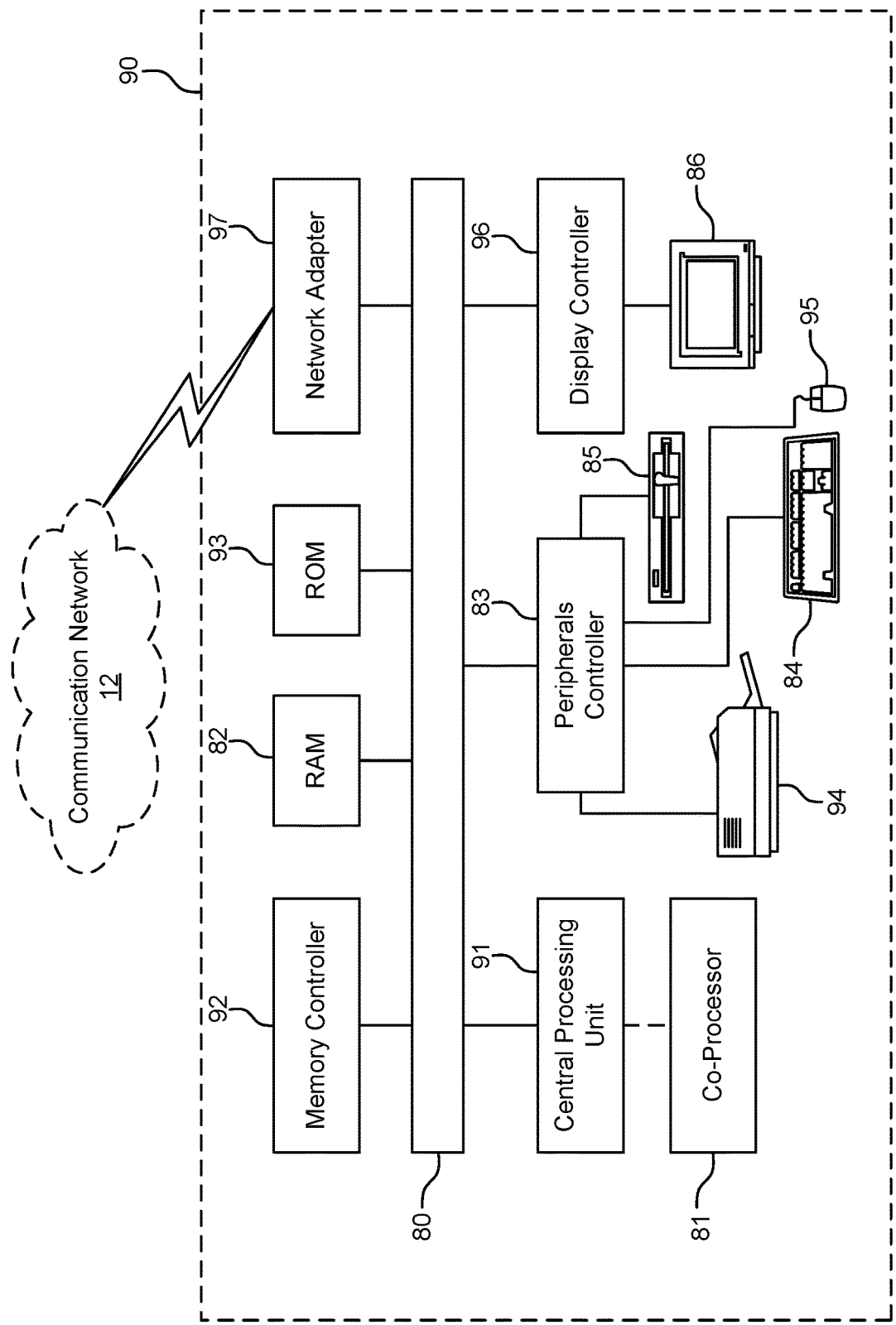
FIG. 30D illustrates an exemplary computing system in which aspects of the communication system of FIG. 30A.

FIG. 30D is a block diagram of an exemplary computing system 90 on which, for example, the M2M service platform 22 of FIG. 30A and FIG. 30B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for enabling analytics of IoT data, such as receiving analytics-related routing or selection messages.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled with system bus 80 include random access memory (RAM) 82 and read only memory (ROM) 93. Such memories include circuitry that allows information to be stored and retrieved. ROMs 93 generally include stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 30A and FIG. 30B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer. A computer-readable storage medium may have a computer program stored thereon, the computer program may be loadable into a data-processing unit and adapted to cause the data-processing unit to execute method steps associated with enabling analytics of IoT data operation when the computer program is run by the data-processing unit.

In describing preferred methods, systems, or apparatuses of the subject matter of the present disclosure—enabling analytics of IoT data—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Disclosed herein is a new Analytics Management Service (AMS), which may coordinate the analysis of IoT data from multiple independent sources and organizing the results of the analysis. Methods, systems, and apparatuses, among other things, as described herein may enable analytics of IoT data. A method, system, computer readable storage medium, or apparatus has means for obtaining a message comprising a result from AF; based on the message, an AMS may store the result based on the Result Location attributes of a first AMS policy; and based on the stored result, then there may be particular annotation, duplication, or linking used for storage. A method, system, computer readable storage medium, or apparatus has means for receiving a request to create an analytics management service (AMS) policy, wherein the AMS policy comprises an indication of a internet of things (IoT) data selection criteria; based on the request, determining a data mode for the AMS policy when created; creating the AMS policy based on the data mode, wherein the AMS policy is checked based on the data mode; and adding the AMS policy to a registry of AMS policies. The methods, systems, and apparatuses may have means for discovering existing service layer data that matches the IoT data selection criteria. The IoT data selection criteria may include an identity of a user equipment. The methods, systems, and apparatuses may have means for sending, based on data representation information, the discovered service layer data to an AF. Based on the data mode being a periodic schedule data mode, there may be a check of the AMS policy, in which the check may be based on a schedule provided in the request. Based on the data mode being a continuous data mode, there may be checking of the AMS policy each time new IoT service layer data is created. Existing service layer data that matches the identity of a user equipment may be discovered. The discovered SL data may be used for further processing (e.g., steps of FIG. 17-FIG. 19). The AMS policy may include an indication of analytics function configuration or the like (e.g., Table 1-Table 6). It is contemplated that in addition to or instead of the data mode other information of Table 1 may be used (separately or in combination) to determine how or whether to update or create the AMS policy or to add the AMS policy to a particular group of other AMS policy, which may assist with more effective processing. A method, system, computer readable storage medium, or apparatus has means for receiving a request to create an analytics management service (AMS) policy, wherein the AMS policy comprises IoT Data Selection Criteria (which may define how to select appropriate data sources), Analytics Function Configuration (which may define what AFs to use and what data are to be sent to those AFs), or Results Storage (which may define how or where the analytical result are stored); based on the request, create an AMS policy; and adding the created AMS policy to a registry of AMS policies. A method, system, computer readable storage medium, or apparatus has means for receiving a new data; based on the received new data, check which AMS policy is applied; and based on which AMS policy is applied, sending the data to appropriate AF for analytics and storing the analytical results, according to the instructions in the applied AMS policy. A method, system, computer readable storage medium, or apparatus has means for receiving data (e.g., by an apparatus); responsive to receiving the data, determining which AMS policies to apply; determining that a first AMS policy of the AMS polices should apply to processing the data; based on the first AMS policy, sending the data to an analytics function (e.g., for analytics processing), wherein the analytics function produces analytics results; and storing the analytics results according to the first AMS policy. All combinations in this paragraph (including the removal or addition of steps) are contemplated in a manner that is consistent with the other portions of the detailed description.

What is claimed:

1. An apparatus for operating common analytics management service (AMS) in a service supporting service capabilities through a set of application programming interfaces (APIs), the service being provided as middleware between application protocols and applications, the apparatus comprising:
   one or more processors; and
   one or more memory coupled with the one or more processors, the one or more memory comprising executable instructions that when executed by the processor cause the one or more processors to effectuate operations comprising:
      receiving from an application a request to create an AMS policy for analyzing internet of things (IoT) data, wherein the AMS policy specifies an analysis to be performed on the IoT data by configuring two or more analytic functions (AFs) of a plurality of AFs in the service to perform an analysis on the IoT data, each of the two or more AFs being for a respective different analytic prepared as part of the service capabilities in the service, and the AMS policy defines how analytic results received from the two or more AFs are conditionally updated with annotations and defines a way the updated analytic results are stored in the service and how to access the analytic results stored in the service;
      based on the received request, creating the AMS policy;
      configuring the two or more AFs according to the AMS policy; and
      executing the analysis based on the configured two or more AFs.

2. The apparatus of claim 1, wherein the AMS policy comprises an analytics function configuration for the two or more AFs.

3. The apparatus of claim 1, wherein the AMS policy comprises an indication of how the IoT data is received from the two or more AFs stored.

4. The apparatus of claim 1, wherein the AMS policy comprises IoT data selection criteria that comprises an identity of a user equipment.

5. The apparatus of claim 1, the operations further comprising:
   determining a data mode for the AMS policy when created, wherein the data mode is for a continuous data mode; and
   based on the data mode being a continuous data mode, checking the AMS policy each time an IoT data is created.

6. The apparatus of claim 1, the operations further comprising:
   determining a data mode for the AMS policy when created, wherein the data mode is for a periodic schedule data mode; and
   based on the data mode being a periodic schedule data mode, checking the AMS policy based on a schedule provided in the request.

7. The apparatus of claim 1, the operations further comprising:

discovering existing IoT data that matches IoT data selection criteria; and sending, based on data representation information, the discovered IoT data to an AF of the two or more AFs.

8. The apparatus of claim 1, the operations further comprising:

receiving IoT data;

responsive to receiving the IoT data, determining which AMS policies to apply;

determining that the AMS policy applies to processing the IoT data;

based on the determining that the AMS policy applies, sending the IoT data to an analytics function for analytics, wherein the analytics function produces analytics results; and storing the analytics results according to the AMS policy.

9. A method for operating common analytics management service (AMS) in a service supporting service capabilities through a set of application programming interfaces (APIs), the service being provided as middleware between application protocols and applications, the method comprising:

receiving from an application a request to create an analytics management service (AMS) policy for analyzing internet of things (IoT) data, wherein the AMS policy specifies an analysis to be performed on the IoT data by configuring two or more analytic functions (AFs) of a plurality of AFs in the service to perform an analysis on the IoT data, each of the two or more AFs being for a respective different analytic prepared as part of the service capabilities in the service, and the AMS policy defines how analytic results received from the two or more AFs are conditionally updated with annotations and defines a way the updated analytic results are stored in the service and how to access the analytic results stored in the service;

based on the received request, creating the AMS policy;

configuring the two or more AFs according to the AMS policy; and executing the analysis based on the configured two or more AFs.

10. The method of claim 9, wherein the AMS policy comprises an indication of a configuration of the two or more AFs.

11. The method of claim 9, wherein the AMS policy comprises how the IoT data received from the two or more AFs is stored.

12. The method of claim 9, wherein the AMS policy comprises IoT data selection criteria that comprises an identity of a user equipment.

13. The method of claim 9, further comprising:

determining a data mode for the AMS policy when created, wherein the data mode is for a continuous data mode; and based on the data mode being a continuous data mode, checking the AMS policy each time an IoT data is created.

14. The method of claim 9, further comprising:

discovering existing IoT data that matches IoT data selection criteria; and sending, based on data representation information, the discovered IoT data to an AF of the two or more AFs.

15. A computer-readable storage medium storing computer executable instructions that comprise instructions for operating common analytics management service (AMS) in a service supporting service capabilities through a set of application programming interfaces (APIs), the service being provided as middleware between application protocols and applications that when executed by a computing device cause said computing device to effectuate operations comprising:

receiving from an application a request to create an analytics management service (AMS) policy for analyzing Internet of things (IoT) data, wherein the AMS policy specifies an analysis to be performed on the IoT data by configuring two or more analytic functions (AFs) of a plurality of AFs in the service to perform an analysis on the IoT data, each of the two or more AFs being for a respective different analytic prepared as part of the service capabilities in the service, and the AMS policy defines how analytic results received from the two or more AFs are conditionally updated with annotations and defines a way the updated analytic results are stored in the service and how to access the analytic results stored in the service;

based on the received request, creating the AMS policy;

configuring the two or more AFs according to the AMS policy; and executing the analysis based on the configured two or more AFs.

16. The computer-readable storage medium of claim 15, wherein the AMS policy comprises an analytics function configuration for the two or more AFs.

17. The computer-readable storage medium of claim 15, wherein the AMS policy comprises an indication of the IoT data received from the two or more AFs is stored.

18. The computer-readable storage medium of claim 15, wherein the AMS policy comprises IoT data selection criteria that comprises an identity of a user equipment.

19. The computer-readable storage medium of claim 15, the operations further comprising:

determining a data mode for the AMS policy when created, wherein the data mode is for a continuous data mode; and based on the data mode being a continuous data mode, checking the AMS policy each time an IoT data is created.

20. The computer-readable storage medium of claim 15, the operations further comprising:

determining a data mode for the AMS policy when created, wherein the data mode is for a periodic schedule data mode; and based on the data mode being a periodic schedule data mode, checking the AMS policy based on a schedule provided in the request.

* * * * *